(12) United States Patent
Qian et al.

(10) Patent No.: US 12,551,442 B2
(45) Date of Patent: Feb. 17, 2026

(54) MULTIFUNCTIONAL MICROSPHERE PREPARATION FOR CHEMOEMBOLIZATION THERAPY AND IMAGING OF TUMORS, AND PREPARATION METHOD THEREFOR

(71) Applicant: FUDAN UNIVERSITY, Shanghai (CN)

(72) Inventors: Yuyi Qian, Shanghai (CN); Wei Lu, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 400 days.

(21) Appl. No.: 18/019,282

(22) PCT Filed: Aug. 9, 2021

(86) PCT No.: PCT/CN2021/111509
§ 371 (c)(1),
(2) Date: Feb. 2, 2023

(87) PCT Pub. No.: WO2022/042279
PCT Pub. Date: Mar. 3, 2022

(65) Prior Publication Data
US 2023/0277460 A1    Sep. 7, 2023

(30) Foreign Application Priority Data

Aug. 25, 2020  (CN) .......................... 202010863646.8

(51) Int. Cl.
*A61K 9/16*    (2006.01)
*A61K 31/136*  (2006.01)
*A61K 51/12*   (2006.01)

(52) U.S. Cl.
CPC .......... *A61K 9/1682* (2013.01); *A61K 9/1635* (2013.01); *A61K 31/136* (2013.01); *A61K 51/1255* (2013.01)

(58) Field of Classification Search
None
See application file for complete search history.

(56) References Cited

U.S. PATENT DOCUMENTS 7,070,809 B2 * 7/2006 Goupil ............. A61B 17/12186
424/501

FOREIGN PATENT DOCUMENTS

CN    101670095 A    3/2010
CN    103613718 A    3/2014

OTHER PUBLICATIONS

Bentolila, Journal of Medicinal Chemistry, 43, 2000 (Year: 2000).*
Yi Shen; "Preparation and Application of Nanomicelles for Radiotherapy of Tumors"; Chinese Master's Theses Full-text Database, Engineering Science 1; No. 2; Feb. 15, 2019; whole document.
Kufeng Li, et al; Research Progress in Drug Loading and Visualization of Ion-exchange Microsphere Embolic Agents; vol. 47, No. 5; Dec. 31, 2018; pp. 106-109.
Hui Liu, et al; "Improvemenet of Embolic Materials in Vascular Interventional Therapy of Patients with Primary Liver Cancer"; Journal of Practical Hepatology; vol. 18, No. 3; May 31, 2015; pp. 333-336.
International Search Report issued in the corresponding international patent application PCT/CN2021/111509 dated Nov. 11, 2021.

* cited by examiner

*Primary Examiner* — Robert A Wax
*Assistant Examiner* — William Craigo
(74) *Attorney, Agent, or Firm* — Kenneth Q. Lao; WARE FRESSOLA MAGUIRE & BARBER LLP

(57) ABSTRACT

In the microsphere preparation for chemoembolization therapy and nuclear medicine imaging of tumor, and a preparation method thereof, the microsphere is formed by means of using a polyvinyl alcohol derivative as a framework material and polymerizing, crosslinking and curing same with an N-acryl amino acid monomer. The microsphere can label radionuclide iodine and can also absorb load chemotherapeutic drugs.

11 Claims, 4 Drawing Sheets

Figure 1:
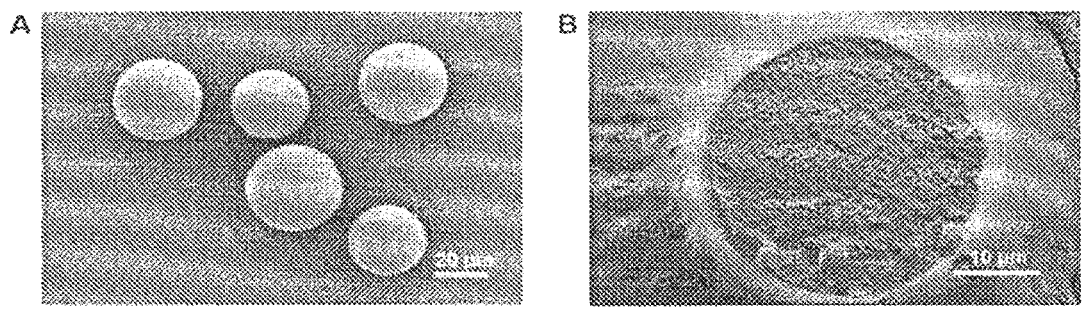

MULTIFUNCTIONAL MICROSPHERE PREPARATION FOR CHEMOEMBOLIZATION THERAPY AND IMAGING OF TUMORS, AND PREPARATION METHOD THEREFOR

TECHNICAL FIELD

The invention belongs to the field of pharmaceutical preparations, in particular to a microsphere preparation and its preparation method which can be used in the radio-chemoembolization and nuclear medicine imaging of tumors.

BACKGROUND TECHNOLOGIES

The existing technology has disclosed that the incidence rate of malignant tumors is on the rise year by year. Relevant statistics show that the death rate caused by malignant tumors is only second to cardiovascular diseases worldwide. At present, the treatment of malignant tumors mainly includes surgical resection, radiotherapy and chemotherapy. Studies have shown that most malignant tumors have a rich vascular system, which not only provides necessary nutrients for tumor growth but also plays an important role in metastasis in the later stage of tumor. Embolization therapy of tumor refers to "starving" the tumor by blocking the specific blood vessels supplying the tumor and blocking the nutrient supply for the tumor. With embolization therapy, the combination of chemotherapy drugs or radionuclide therapy can increase the therapeutic effect.

The commonly used embolization agents in tumor chemoembolization include lipiodol and DC Bead™. After pushing the aqueous solution of chemotherapeutic drugs and lipiodol back and forth to form a stable W/O emulsion, it can prolong the survival of patients to a certain extent by chemoembolization treatment. Relevant practice shows that the embolization time of tumor blood vessels in lipiodol is short, and the burst release of chemotherapeutic drugs in lipiodol is severe, which is easy to cause toxic reactions in normal tissues. As a solid embolic microsphere, DC Bead™ overcomes many shortcomings of lipiodol in chemoembolization. DC Bead™ is able to achieve permanent embolism, prolong the embolization time, and the loaded drug can be released slowly, so that the tumor site can maintain a high drug concentration. Whereas, the drug concentration in the peripheral blood is reduced, thus avoiding the systemic toxicity.

Therapeutic radionuclide $^{131}I$ has a decay half-life of 8 days and emits β ray. The maximum energy of the β ray is 0.81 MeV. The maximum penetration depth is 2 mm, which is an ideal internal irradiation nuclide. It also emits γ ray. The maximum energy of ray is 364 keV, which can be used for emission computed tomography imaging or single photon emission computed tomography imaging. $^{131}I$ labeled lipiodol has been used in the clinical embolization therapy of liver cancer by internal irradiation and radiotherapy, and achieved a good therapeutic effect. However, due to the deposition of lipiodol in lung, it is easy to cause side effects such as lung injury, which limits its clinical application. At present, $^{131}I$-labeled lipiodol products have been withdrawn by European manufacturers.

Although chemoembolization and radioembolization can prolong the survival period of cancer patients to a certain extent, the therapeutic effect is still limited. Clinical trials have shown that chemoembolization combined with external irradiation can further prolong the survival time of patients. However, the external irradiation causes radiation damage to non-tumor areas, resulting in great side effect for patients. Therefore, the combination of embolization, chemotherapy and internal irradiation radiotherapy is expected to improve the effect of tumor treatment while reducing the dose and toxic side effects.

On the other hand, in view of the shortcomings of lipiodol as a chemoembolization and radiotherapy embolization preparation, it is necessary to design and prepare new microsphere preparations to achieve stable labeling of radionuclide iodine, stable encapsulation of chemotherapy drugs, and permanent embolization of tumor blood vessels, so as to realize the synergetic therapy of embolization, chemotherapy and internal radiation radiotherapy. At the same time, γ-rays emitted by radionuclides can be used for emission computed tomography or single photon emission computed tomography to monitor the distribution of microspheres in vivo in real time, realizing the theranostics of the preparation.

Aiming at the basis and current situation of the prior technology, the invention intends to provide a microsphere embolic agent that integrates chemotherapy, internal radiation radiotherapy and embolization therapy and is used for emission computed tomography or single photon emission computed tomography. This kind of microsphere preparation is able to encapsulate various chemotherapy drugs and can also label radionuclide iodine with high labeling stability. Compared with chemoembolization microspheres or radioembolization microspheres, the combined chemotherapy and radiotherapy embolization preparation disclosed in this invention can achieve the same therapeutic effect while the required amount of chemotherapeutic drugs and therapeutic nuclide dose is significantly reduced.

CONTENT OF INVENTION

The purpose of the invention is to provide a multifunctional microsphere preparation and its preparation method which can be used for radio-chemoembolization therapy and imaging of tumors according to the basis and current situation of the present technology. The microsphere is made of polyvinyl alcohol derivative as the skeleton material, polymerized and cross-linked with N-acryl amino acid monomer. This kind of microspheres is able to be used to label radionuclide iodine and also adsorb chemotherapy drugs. The multifunctional microsphere preparation can realize the combined treatment of tumor embolization and radio-chemotherapy, and emission computed tomography or single photon emission computed tomography at the same time.

The structural formula of polyvinyl alcohol derivative macromolecular monomer required in the microsphere preparation of this invention shows as follows:

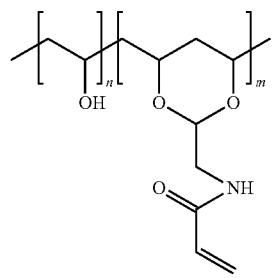

Where the molecular weight range is 10 kDa~1000 kDa, preferably 75 kDa. The polyvinyl alcohol derivative monomer is formed by the aldolization of N-(2, 2-dimethoxyethyl)-2-acrylamide with the hydroxyl group of polyvinyl alcohol. The substitution degree of N-(2, 2-dimethoxyethyl)-2-acrylamide ranges from 0.1% to 40%. And 10% to 15% is preferred.

The structure of N-acryl amino acid monomer added into the microsphere preparation of the invention is generally described as follows:

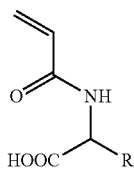

Where R is one or more of the following structures:

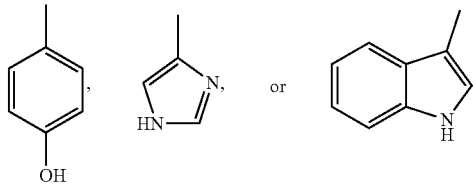

N-acryl tyrosine is preferred.

The molar ratio of the N-acryl amino acid monomer and polyvinyl alcohol derivative macromolecular monomer in the microsphere preparation relates to the invention ranges from 50:1 to 1000:1. And 245:1 to 260:1 is preferred.

The invention provides a method for preparing the microsphere preparation, including the following steps:
(1) An aqueous solution of N-acryl amino acid monomer, polyvinyl alcohol derivative macromolecular monomer and the initiator potassium sulfate are prepared, respectively.
(2) An oil phase solution containing an emulsifier or dispersant is prepared, where the oil phase is liquid paraffin, butyl acetate, soybean oil or silicone oil, the emulsifier is span 80 or span 60, and the dispersant is cellulose acetate butyrate.
(3) The aqueous solution is added drop by drop to the oil phase to form an emulsion.
(4) The aqueous solution containing catalyst N, N, N', N'-tetramethylethylenediamine is added to the emulsion to catalyze the polymerization crosslinking reaction and solidification to form microspheres.
(5) The microspheres are washed and screened to obtain the microspheres with different size range.

Among them:

The preparation steps of the solution containing N-acryl amino acid monomer in step (1) are as follows: the solution of N-acryl amino acid is dissolved in sodium hydroxide solution, the concentration of the solution is preferably 200~400 mg/mL, the volume is preferably 0.1~20 mL, and the pH is adjusted to neutral by adding concentrated hydrochloric acid. The mass range of N-acryl amino acid is 0.1~20 g preferably.

The concentration of polyvinyl alcohol derivatives macromolecular monomer solution in step (1) is optimized to be 7.5%~20%. The volume of polyvinyl alcohol derivatives macromolecular monomer solution is preferably 2~200 mL.

The concentration of potassium persulfate solution in step (1) is preferably 100-200 mg/mL, and the volume of potassium persulfate solution is preferably 0.05~10 mL.

The oil phase in step (2) can be liquid paraffin, soybean oil, silicone oil, where liquid paraffin is preferred. The volume of liquid paraffin ranges preferably 10~1000 mL. The emulsifier can be preferably span 80 or span 60. The dosage of the span 80 ranges preferably from 0.05 to 15 g.

The volume of N, N, N', N'-tetramethylethylenediamine solution in step (4) is preferably 0.2~20 mL. The concentration is preferably 5%~15% (v/v).

In step (4), the temperature of catalytic polymerization crosslinking reaction is preferably 25~60° C., and the reaction time is preferably 2~12 h.

The washing procedure in step (5) is: ethyl acetate, absolute ethanol and ultrapure water are used to wash in turn, and each solvent is used to wash twice.

The particle size range of microsphere screened in step (5) is 20~120 μm, 120~200 μm, 200~300 μm, 300~500 μm, 500~700 μm, 700~900 μm, 900~1100 μm, or 1100~1300 μm, where 20~120 μm is preferred.

The microsphere preparation of the invention is able to simultaneously label one or more of the following radionuclide iodine: iodine-123, iodine-125, iodine-131, preferably iodine-131.

In the invention, the steps of radioisotope iodine labeling are as follows:
(1) The microspheres are suspended in a phosphate buffer solution.
(2) A sodium iodide solution containing the radionuclide iodine is added to (1) the microsphere suspension and mixed evenly.
(3) The phosphate buffer solution containing chloramine-T is added to (2) the mixture and shaken gently to mix.
(4) The reaction solution is placed in a 25~45° C. water bath for 10~60 minutes.
(5) The suspension of microspheres in (4) is centrifugated and then washed, and the precipitation is radionuclide iodine labeled microspheres.

Among them, the pH of phosphate buffer solution in step (1) is 7.4, the volume is preferably 0.1~10 mL, and the mass of microsphere powder is preferably 5~500 mg.

The activity of the radionuclide iodine solution in step (2) is preferably 10~100 mCi/mL, and the volume of the added radionuclide iodine solution is preferably 0.01~10 mL.

The volume of chloramine-T solution in step (3) is preferably 0.01~10 mL, and the concentration of chloramine-T solution is preferably 1~10 mg/mL.

In step (4), the optimal temperature of the water bath is 25~45° C., and the labeling time is 10~60 minutes.

By the radionuclide iodine labeling procedure aforementioned, the labeling rate of the microsphere preparation reaches 81% — 99.5%.

The microsphere preparation of the invention is able to load one or more of the following chemotherapeutic drugs by ion exchange or adsorption: doxorubicin hydrochloride, epirubicin, daunorubicin, mitoxantrone, irinotecan, topotecan, preferably doxorubicin hydrochloride.

The steps of loading chemotherapeutic drugs in the microsphere preparation and radioactive microsphere labeled with radionuclide iodine are as follows:
(1) The chemotherapeutic drugs are dissolved in ultrapure water and prepared into chemotherapeutic drug solution.

(2) The solution in (1) is added to the prepared microsphere suspension or to the prepared radionuclide iodide labeled microsphere suspension, shaken for several times and allowed to stand for 5~30 minutes.

(3) After the centrifugation of the mixed solution in (2), the supernatant is removed to obtain the drug-loaded microspheres.

The microsphere preparation and the radioactive microsphere labeled with radionuclide iodine in the invention are loaded with chemotherapeutic drugs through the above steps. The loading efficiency of doxorubicin hydrochloride, epirubicin, daunorubicin, mitoxantrone, irinotecan and topotecan is 10%~60%, 7%~45%, 10%~43%, 9%~35%, 8%~30% and 5%~25%, respectively.

The composition of the microsphere preparation may also include 2-acrylamido-2-methylpropanesulfonic acid monomer. Among them, the molar ratio range of N-acryl amino acid, 2-acrylamido-2-methylpropanesulfonic acid monomer and polyvinyl alcohol derivative macromolecular monomer is 50:50:1~1000:1000:1.

The preparation method of the microsphere preparation is as follows:

(1) Prepare a solution of N-acryl amino acids.
(2) Prepare 2-acrylamido-2-methylpropanesulfonic acid solution.
(3) Prepare polyvinyl alcohol derivatives macromolecular monomer solution.
(4) Prepare a solution of potassium persulfate.
(5) The solution in steps (1), (2), (3) and (4) is mixed evenly and prepared as the water phase.
(6) Add the water phase in step (5) to the oil phase containing the dispersant and stir under a nitrogen atmosphere.
(7) Prepare N, N, N', N'-tetramethylenediamine solution.
(8) The solution in step (7) is added to the mixed solution in step (6) under a nitrogen atmosphere, and continued to react for 1~10 h.
(9) The reaction liquid in step (8) is centrifuged, precipitated, washed and dispersed in ultrapure water.
(10) The precipitation solution in step (9) is wet-sieved to obtain microspheres with different particle size ranges.

In step (1), 200~400 mg/mL sodium hydroxide solution is used to dissolve N-acryl amino acids. The volume of sodium hydroxide solution is optimized to be 0.1~20 mL, and the pH is adjusted to neutral by adding concentrated hydrochloric acid. The mass of N-acryl amino acid is preferably to be 0.1~20 g.

In step (2), the mass of 2-acrylamido-2-methylpropanesulfonic acid is preferred to be 0.1~20 g. Dissolve it in ultrapure water, and the volume is preferred to be 0.1~20 mL.

In step (3), the concentration of polyvinyl alcohol derivatives macromolecular monomer solution is 10%~21%. The volume of polyvinyl alcohol derivatives macromolecular monomer solution is preferred to be 1~200 mL.

The concentration of potassium persulfate solution in step (4) is preferably 100~200 mg/mL. The volume of potassium persulfate solution is preferably 0.05~10 mL.

The oil phase in step (6) is preferably butyl acetate. The volume of butyl acetate is preferably 30~3000 mL. The dispersant is preferably cellulose acetate butyrate, and the dosage of cellulose acetate butyrate is preferably 0.3~30 g.

The N, N, N', N'-tetramethylenediamine solution in step (7) is preferably 0.3~25 mL; The optimal concentration is 6%~17% (v/v).

The temperature of the water bath in step (8) is preferably 45~65° C.

The washing sequence in step (9) is optimized as follows: ethyl acetate, absolute ethanol, and ultrapure water. Each solvent is used to wash twice in turn.

In step (10), the size range of sieved microspheres is 20~120 μm, 120~200 μm, 200~300 μm, 300~500 μm, 500~700 μm, 700~900 μm, 900~1100 μm, or 1100~1300 μm, preferably 20~120 μm.

The monomer composition of the microsphere preparation of the invention may also include N, N'-methylenebisacrylamide, wherein the molar ratio range of N-acryl amino acid, N, N'-methylenebisacrylamide and polyvinyl alcohol derivative macromonomer is preferably 50:5:1~1000:200:1.

The preparation method of the microsphere preparation is as follows:

(1) Preparation N-acryl amino acid solution.
(2) Prepare N, N'-methylene bisacrylamide solution.
(3) Prepare the solution of polyvinyl alcohol derivatives macromolecular monomer.
(4) Prepare a solution of potassium persulfate.
(5) The solution in steps (1), (2), (3) and (4) is mixed evenly as the water phase.
(6) Add the water phase in step (5) to the oil phase containing the dispersant and stir under a nitrogen atmosphere.
(7) Prepare N, N, N', N'-tetramethylenediamine solution.
(8) The solution in step (7) is added to the mixed solution in step (6) under a nitrogen atmosphere, and continued to react for 6~24 h.
(9) The reaction liquid in step (8) is centrifuged, precipitated, washed and dispersed in
(10) The precipitation solution in step (9) is wet-sieved to obtain microspheres with different particle size ranges.

In step (1), 200~400 mg/mL sodium hydroxide solution is used to dissolve N-acryl amino acids. The volume of sodium hydroxide solution is optimized to be 0.1~20 mL, and the pH is adjusted to neutral by adding concentrated hydrochloric acid. The mass of N-acryl amino acid is preferably to be 0.1~20 g.

In step (2), the mass of 2-acrylamido-2-methylpropanesulfonic acid is preferred to be 0.01~5 g. Dissolve it in ultrapure water, and the volume is preferred to be 0.1~15 mL.

In step (3), the concentration of the polyvinyl alcohol derivatives macromolecular monomer solution is 7.5%~20%. The volume of polyvinyl alcohol derivatives macromolecular monomer solution is preferred to be 1~200 mL.

The concentration of potassium persulfate solution in step (4) is preferably 100~200 mg/mL. The volume of potassium persulfate solution is preferably 0.05~10 mL.

The oil phase in step (6) can be liquid paraffin, soybean oil, silicone oil, preferably liquid paraffin; The volume of liquid paraffin is preferably 10~1000 mL. The emulsifier can be span 80 and span 60, preferably span 80, and the dosage of span 80 is preferably 0.05~15 g.

The N, N, N', N'-tetramethylenediamine solution in step (7) is preferably 0.2~20 mL. The optimal concentration is 5%~15% (v/v).

The temperature of the water bath in step (8) is preferably 30~50° C.

The washing sequence in step (9) is optimized as follows: ethyl acetate, absolute ethanol, and ultrapure water. Each solvent is used to wash twice in turn.

In step (10), the size range of microspheres after sieving is 20~120 μm, 120~200 μm, 200~300 μm, 300~500 μm, 500~700 μm, 700~900 μm, 900~1100 μm, or 1100~1300 μm, preferably 20~120 μm.

The microsphere preparation labeled with radionuclide iodine-125 or iodine-131 can be used for the combined treatment of embolization, radiotherapy and chemotherapy for liver cancer, liver metastases, uterine fibroids, kidney cancer or pancreatic cancer. Radionuclide iodine-131 can be used for emission computed tomography or single photon emission computed tomography.

The invention relates to the microsphere preparation labeled with radionuclide iodine-123, which can be used for the combined treatment of embolization and chemotherapy for liver cancer, liver metastases, uterine fibroids, kidney cancer or pancreatic cancer. Meanwhile, radionuclide iodine-123 can be used for emission computed tomography or single photon emission computed tomography.

DESCRIPTION OF ATTACHED FIGURES

FIG. 1. Field emission SEM of DOX-NAT-PVA microsphere (A) and its cross-section (B).

Figure 2:
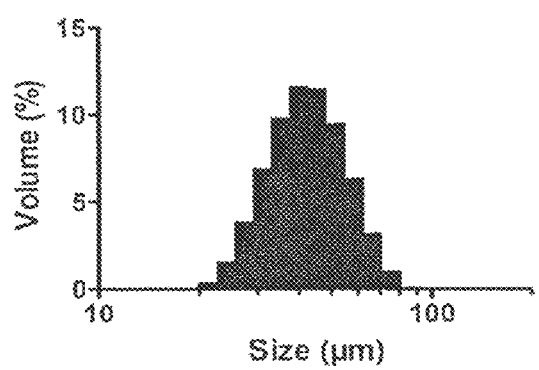

FIG. 2. Size distribution of DOX-NAT-PVA microspheres.

Figure 3:
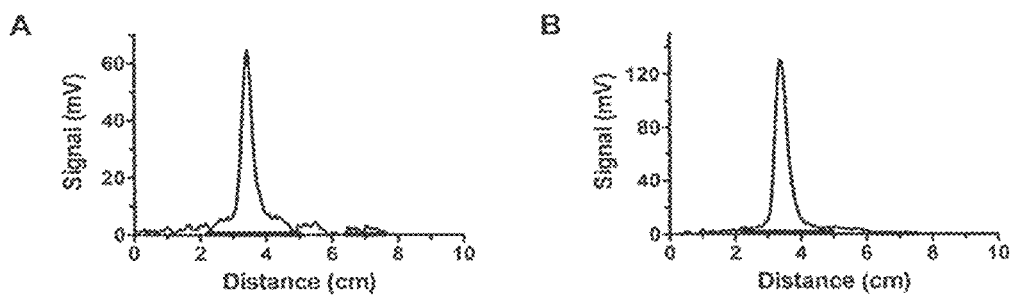

FIG. 3. Scanning of radioactive thin layer chromatography of $^{131}$I-DOX-NAT-PVA microspheres: (A) $^{131}$I-DOX-NAT-PVA microspheres were sampled immediately after labeling, (B) $^{131}$I-DOX-NAT-PVA microspheres were sampled after centrifugation and washing, of which the labeling rate was 92.39%±1.51%.

Figure 4:
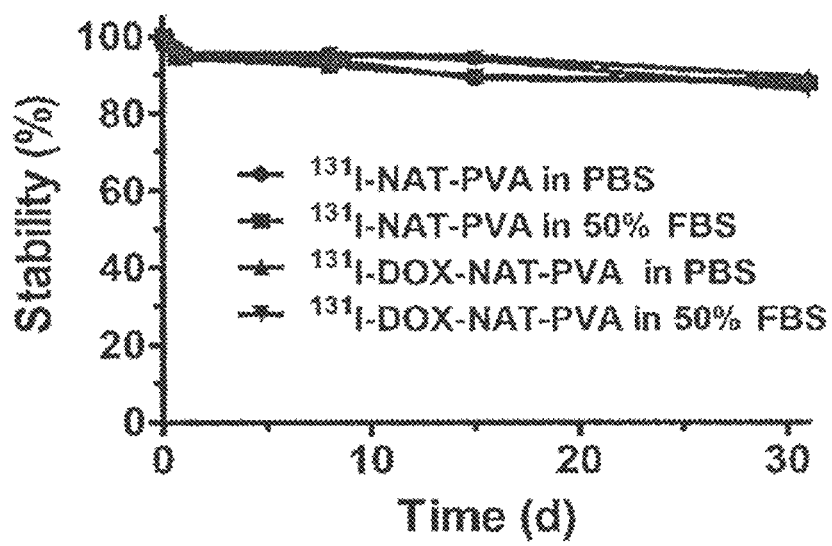

FIG. 4. Labeling stability of $^{131}$I-NAT-PVA microspheres and $^{131}$I-DOX-NAT-PVA microspheres in phosphate buffer saline (PBS) and 50% fetal bovine serum (FBS).

Figure 5:
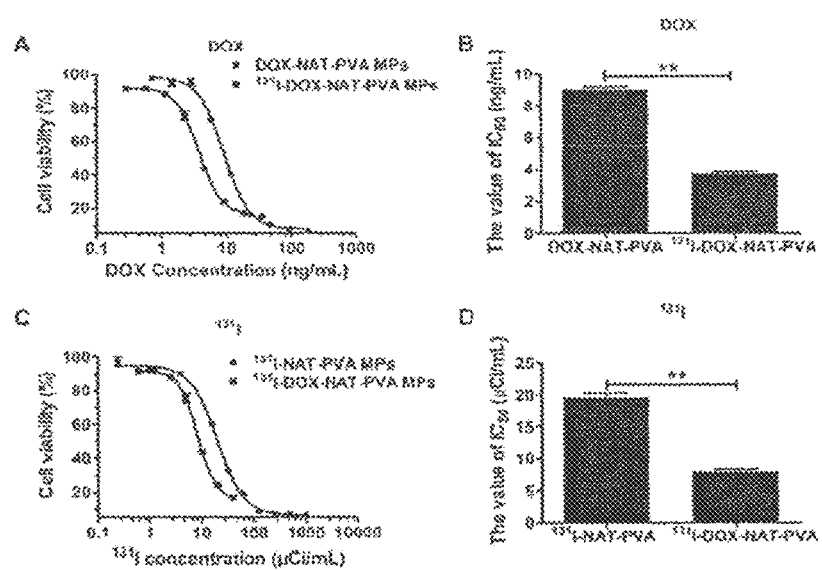

FIG. 5. Determination and comparison of $IC_{50}$ values of DOX in DOX-NAT-PVA microspheres and $^{131}$I-DOX-NAT-PVA microspheres after incubation for 72 h (A, B); Determination and comparison of $IC_{50}$ values of $^{131}$I in $^{131}$I-NAT-PVA microspheres and $^{131}$I-DOX-NAT-PVA microspheres (C, D) (mean±SD, n=3, **p<0.01).

Figure 6:
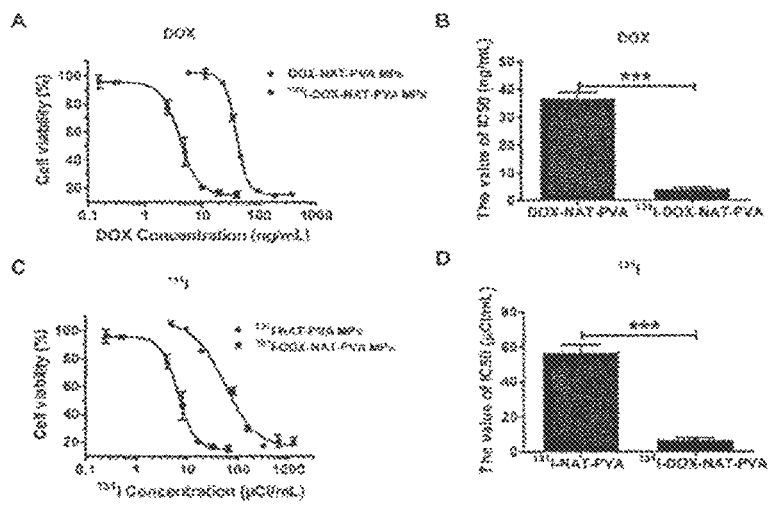

FIG. 6. Determination and comparison of $IC_{50}$ values of DOX in DOX-NAT-PVA microspheres and $^{131}$I-DOX-NAT-PVA microspheres under hypoxia condition (A, B); Determination and comparison of $IC_{50}$ values of $^{131}$I in $^{131}$I-NAT-PVA microspheres and $^{131}$I-DOX-NAT-PVA microspheres (C, D) (mean±SD, n=3, ***p<0.001).

Figure 7:
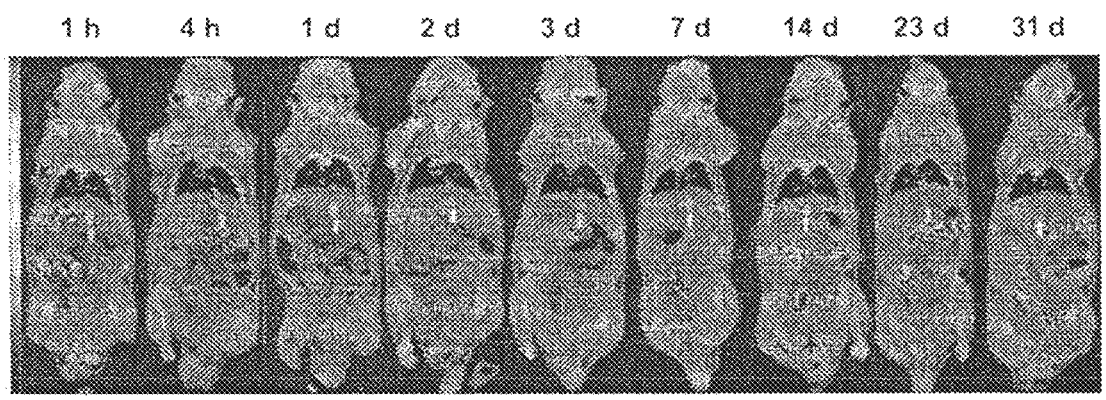

FIG. 7. SPECT/CT images of a model rat at the predetermined time points after hepatic artery embolization (arrow indicates the location of microspheres). h, hour; d, day.

Figure 8:
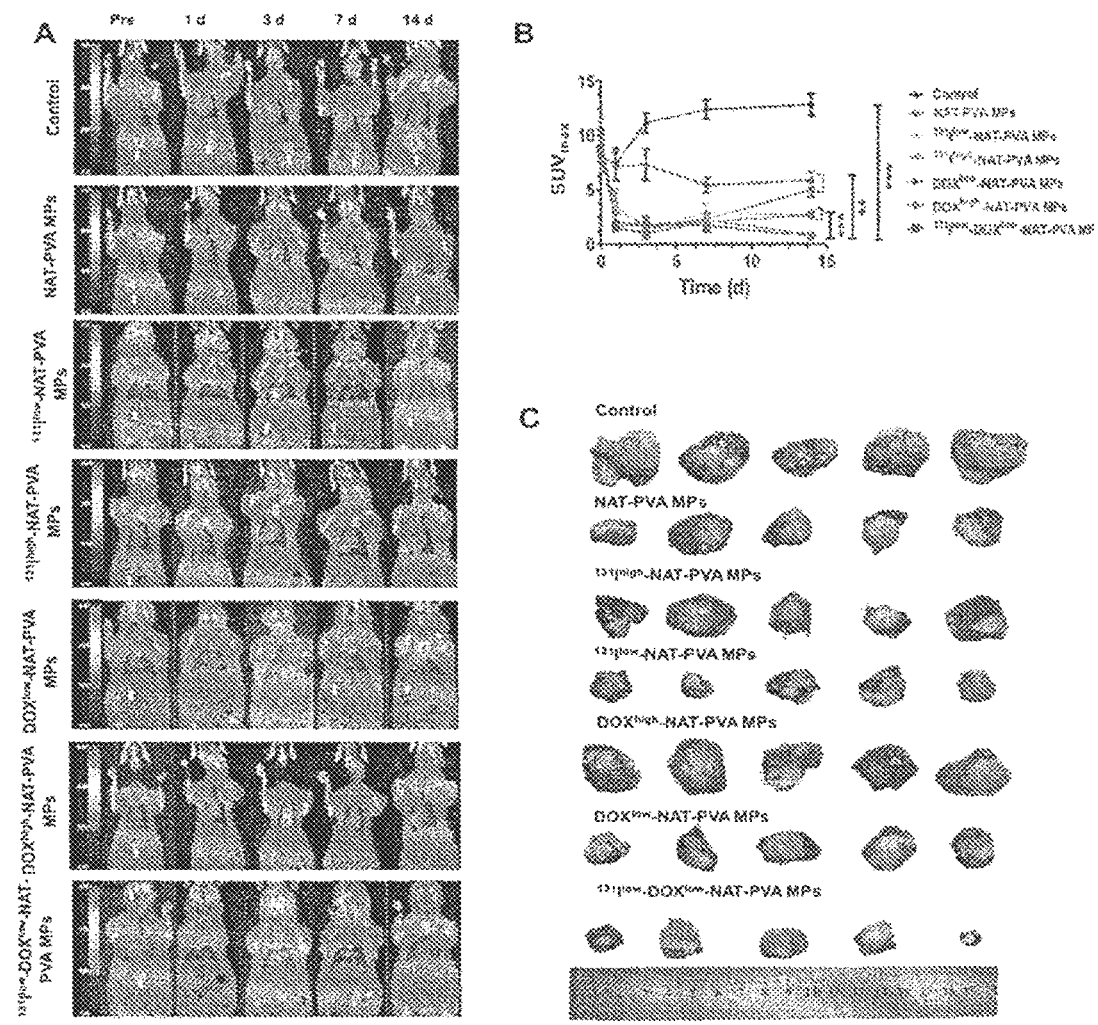

FIG. 8. (A) The rats bearing orthotopic hepatocellular carcinoma of each treatment group were injected with $^{18}$F-FDG through the tail vein before hepatic artery embolization (Pre) and at 1, 3, 7, and 14 days after hepatic artery embolization, respectively. Small animal PET/CT imaging was used to monitor the changes of $^{18}$F-FDG uptake at the tumor site (arrow indicates tumor location. The dose of each treatment group showed as follows: Control group was injected with 0.2 mL saline. NAT-PVA group was injected with 0.2 mL NAT-PVA microsphere suspension, containing 0.04 mL microsphere. $^{131}$I$^{low}$-NAT-PVA group was injected with 0.2 mL $^{131}$I-NAT-PVA microsphere suspension, containing 0.04 mL microsphere, 200 µCi of $^{131}$I. $^{131}$I$^{high}$-NAT-PVA group was injected with 0.2 mL $^{131}$I-NAT-PVA microsphere suspension, containing 0.04 mL microsphere, 500 µCi of $^{131}$I. DOX$^{low}$-NAT-PVA group was injected with DOX-NAT-PVA microsphere suspension 0.2 mL, containing 0.04 mL microspheres and 0.5 mg of DOX. DOX$^{high}$-NAT-PVA group was injected with 0.2 mL DOX-NAT-PVA microsphere suspension, containing 0.04 mL microspheres, 2.5 mg of DOX. $^{131}$I$^{low}$-DOX$^{low}$-NAT-PVA group was injected with $^{131}$I-DOX-NAT-PVA microsphere suspension 0.2 mL, containing 0.04 mL microspheres, 0.5 mg of DOX, 200 µCi of $^{131}$I). (B) The curve of the maximum uptake of $^{18}$F-FDG ($SUV_{max}$) at tumor sites in each treatment group over time (mean±SD, n=5, *p<0.05, p<0.01, *p<0.001). (C) The photographs of tumors resected in each treatment group after 14 days of hepatic artery embolization. d, day.

DETAILED DESCRIPTION OF THE PREFERRED EMBODIMENTS

The present invention is further described with the following embodiments and figures.

Example 1

N-acryl tyrosine (NAT) (120 mg) was weighed and dissolved in 120 µL of sodium hydroxide solution (400 mg/mL). The pH of solution was adjusted to neutral by adding concentrated hydrochloric acid. N, N'-methylene bisacrylamide (40 mg) was weighed and dispersed in 150 µL ultrapure water under ultrasonification, followed by addition of 1.334 mL of 7.5% polyvinyl alcohol derivatives (molecular weight of polyvinyl alcohol: 75 kDa, N-(2,2-dimethoxyethyl)-2-acrylamide substitution degree: 12%~13%), and continued to be dissolved under ultrasonification. To the polyvinyl alcohol derivatives solution, the above NAT solution was added and mixed evenly. Then, potassium persulfate solution (150 mg/mL, 87 µL) was added and mixed evenly. Then, the mixture was added into 8 mL of liquid paraffin wax containing 0.12 g of span 80. The solution was stirred and emulsified in 37° C. water bath under a nitrogen atmosphere at 600 rpm for 10 minutes. Then, 200 µL of N, N, N'N'-tetramethylethylenediamine solution (10%, v/v) was added drop by drop. The reaction was placed under a nitrogen atmosphere and continued to stir for 12 h. After the reaction, the reaction solution was centrifuged at 5000 rpm for 5 minutes, and the liquid paraffin wax was removed. The precipitation was washed twice by ethyl acetate, absolute ethanol and ultrapure water sequentially. Then, a small amount of ultrapure water was added to disperse the precipitation. The precipitation was sifted through 70 µm- and 40 µm-sized mesh screens in order to remove the trapped part on the 70 µm-sized mesh screens and the filtered part of 40 µm-sized mesh screens, respectively. The precipitation between the 40 µm- and 70 µm-sized mesh screens was collected and centrifuged with acetone twice for dehydration. The NAT-PVA microspheres were dried overnight in a vacuum oven at room temperature.

Microspheres (5 mg) were weighed and suspended in 100 µL of pH 7.4 PBS (0.01 M). Then, 10 µL of 10 mCi/mL Na$^{131}$I solution was added into the microsphere suspension and mixed. Then, 10 mg/mL of chloramine-T PBS solution (10 µL) was added and shaken and mixed. The microsphere suspension was placed in a 37° C. water bath and labeled for 30 minutes. After the labeling, 5 µL of microsphere solution was withdrawn for radioactive paper chromatography to determine the labeling rate of microspheres. The remaining labeled microspheres were centrifuged at 5000 rpm for 5 minutes. The supernatant was removed, and the precipitation was further washed with ultrapure water until the radioactivity of the supernatant was not detectable. An additional 5 µL of microsphere solution was withdrawn to analyze the radiochemical purity of the washed microspheres by radioactive paper chromatography.

$^{131}$I-NAT-PVA microspheres (15 mg) were prepared and suspended with 200 µL ultrapure water. About 7.5 mg of doxorubicin hydrochloride was weight and dissolved in 200

μL ultrapure water. The doxorubicin solution was added to the microsphere suspension, and thoroughly mixed under gentle shaking. Then, the suspension was allowed to stand followed by shaken every 5 minutes. After about 15 minutes, the color of the supernatant did not change. The supernatant was centrifuged at 5000 rpm for 5 minutes and collected. The precipitate was washed three times with ultrapure water.

Under field emission scanning electron microscopy, the microspheres were uniform in size and round (FIG. 1). The average particle size of the microspheres was about 51.4±3.3 μm (FIG. 2). The drug loading and encapsulation rate of microspheres were 33.25%±1.73% and 99.76%±0.18%, respectively. The results of radioactive paper chromatography showed that the labeling rate of the microspheres was 92.59%±1.51%, and the radiochemical purity was 99.46%±0.47% (FIG. 3). The results of the in vitro labeling stability showed that the radiochemical purity maintained over 85% at 31 days (FIG. 4).

The $IC_{50}$ values of DOX and $^{131}I$ were 3.74±0.240 ng/mL and 8.15±0.521 μCi/mL, respectively, after $^{131}I$-DOX-NAT-PVA microspheres were incubated with N1S1 rat hepatocellular carcinoma cells for 72 h under normoxia. The $IC_{50}$ values of DOX in the group of DOX-NAT-PVA microspheres was 9.26±0.127 ng/mL, and that of $^{131}I$ in the group of $^{131}I$-NAT-PVA microspheres was 19.56±1.190 μCi/mL. The results showed that DOX chemotherapy and $^{131}I$ radiotherapy by $^{131}I$-DOX-NAT-PVA microspheres had a synergistic effect, with a synergistic index of 0.82 (FIG. 5). The $IC_{50}$ values of DOX and $^{131}I$ were 4.20±1.14 ng/mL and 6.68±1.25 μCi/mL, respectively, after $^{131}I$-DOX-NAT-PVA microspheres were incubated with NIS1 cells for 72 h under hypoxia. The $IC_{50}$ of DOX in the group of DOX-NAT-PVA microspheres was 37.98±2.58 ng/mL, and the $IC_{50}$ of $^{131}I$ in the group of $^{131}I$-NAT-PVA microspheres was 57.12±7.41 μCi/mL with $^{131}I$-NAT-PVA microspheres. The results showed that DOX chemotherapy and $^{131}I$ radiotherapy by $^{131}I$-DOX-NAT-PVA microspheres had a synergistic effect, with a synergistic index of 0.23 (FIG. 6).

The results of in vivo animal experiments showed that $^{131}I$-NAT-PVA microspheres injected to rats bearing orthotopic N1S1 hepatocellular carcinoma via hepatic artery could be accurately monitored by SPECT/CT for the distribution of microspheres in the rat model, and provid accurate images of liver tumors up to 31 days post injection (FIG. 7). $^{18}F$-FDG was injected intravenously and small animal PET/CT was used to monitor the growth of N1S1 hepatocellular carcinoma in the rat model after different treatments. The results showed that the median survival of rats in the untreated group was 20 days (n=5). After 14 days of embolization with $^{131}I$-DOX-NAT-PVA microspheres (0.14 mL/kg of microsphere, 200 μCi of $^{131}I$, and 1.67 mg/kg of DOX for combined therapy), $^{18}F$-FDG imaging signal of tumor tissue was negative. No death of the rats was observed at 60 days (n=5). After 14 days of treatment with $^{131}I$-NAT-PVA microsphere of the radioembolization control group (0.14 mL/kg of microsphere, and 500 μCi of $^{131}I$ for high-dose radiotherapy), $^{18}F$-1-DG imaging signal of tumor tissue was negative. No death of the rats was observed until 60 days (n=5). After 14 days of treatment with $^{131}I$-NAT-PVA microsphere radioembolization of the radioembolization control group (0.14 mL/kg of microsphere, and 200 μCi of $^{131}I$ for a low-dose radiotherapy), $^{18}F$-FDG imaging showed tumor recurrence and the median survival time of the rats was 24 days (n=5). After 14 days of treatment with DOX-NAT-PVA microsphere of the chemoembolization control group (0.14 mL/kg of microsphere, and 8.35 mg/kg of DOX for high-dose chemotherapy), $^{18}F$-FDG imaging of tumor tissue was negative. No death of the rats was observed till 60 days (n=5). After 14 days of treatment with DOX-NAT-PVA microsphere of the chemoembolization control group (0.14 mL/kg of microsphere, and 1.67 mg/kg of DOX for low-dose chemotherapy), $^{18}F$-FDG imaging showed tumor recurrence and the median survival time of the rats was 23 days (n=5). After 14 days of treatment with NAT-PVA microsphere of the of the single embolization control group (0.14 mL/kg), $^{18}F$-FDG imaging showed tumor recurrence with a median survival time of 22 days (n=5). This result confirmed that $^{131}I$-DOX-NAT-PVA microspheres had a good synergistic effect on the in vivo radio-chemotherapy of tumor. At a dosage of 200 μCi of $^{131}I$ and 1.67 mg/kg of DOX, $^{131}I$-DOX-NAT-PVA microspheres produced an equivalent therapeutic effect to radioembolization therapy with 500 μCi of $^{131}I$ or chemoembolization therapy with 8.35 mg/kg of DOX, significantly reducing the dose for radiotherapy and chemotherapy (FIG. 8).

In addition, the median survival time of the tumor bearing rats was 21 days (n=5) after embolization with $^{131}I$-lipiodol (0.67 mL/kg of lipiodol, 500 μCi of $^{131}I$). The median survival time of the tumor bearing rats was 22 days (n=5) after embolization with lipiodol-DOX emulsion (0.67 mL/kg of lipiodol, and 8.35 mg/kg of DOX). The median survival time of the tumor bearing rats was 45 days (n=5) after embolization with DC Bead™ chemoembolization microspheres (0.18 mL/kg of microspheres, 75-150 μm of size range, 8.35 mg/kg of DOX).

Example 2

N-acryl histidine (NAH) (150 mg) was weighed and dissolved in 150 μL of sodium hydroxide solution (400 mg/mL). The pH of solution was adjusted to neutral by adding concentrated hydrochloric acid. Then, 35 mg of N, N'-methylene bisacrylamide was weighed and dissolved in 150 μL ultrapure water under ultrasonification, followed by addition of 1.334 mL 7.5% polyvinyl alcohol derivatives (molecular weight of polyvinyl alcohol: 75 kDa, N-(2,2-dimethoxyethyl)-2-acrylamide substitution degree: 12%~13%), and continued to be dissolved under ultrasonification. To the polyvinyl alcohol derivatives solution, the above NAH solution was added and mixed evenly. Then, the potassium persulfate solution (100 μL, 150 mg/mL) was added and mixed evenly. Then, the mixture was added into 8 mL of liquid paraffin wax containing 0.12 g of span 80. The solution was mixed in a water bath at 40° C. and emulsified at 600 rpm for 10 minutes under a nitrogen atmosphere. Then 200 μL of N, N, N', N'-tetramethylethylenediamine solution (10%, v/v) was added drop by drop. The reaction liquid was placed under a nitrogen atmosphere and continued to stir for 12 h. After the reaction, the reaction solution was centrifuged at 5000 rpm for 5 minutes, and the liquid paraffin wax was removed. The precipitation was washed twice with ethyl acetate, absolute ethanol and ultrapure water sequentially. Then, a small amount of ultrapure water was added to disperse the precipitation. The precipitation was sifted through 70 μm- and 40 μm-sized mesh screens in order to remove the trapped part on the 70 μm-sized mesh screens and the filtered part of 40 μm-sized mesh screens, respectively. The precipitation between the 40 μm- and 70 μm-sized mesh screens was collected and centrifuged with acetone twice for dehydration. The NAH-PVA microspheres were dried overnight in a vacuum oven at room temperature.

Microspheres (10 mg) were weighed and suspended in 100 μL of pH 7.4 PBS (0.01 M). Then, 20 μL of Na$^{131}I$ solution (10 mCi/mL) was added into the microsphere suspension. After mixing, 15 μL of chloramine-T PBS solution (10 mg/mL) was added and shaken and mixed. The microsphere suspension was placed in a 40° C. water bath and labeled for 35 minutes. After labeling, the labeling rate of the microspheres was 90.13%±3.11%. Ultrapure water (1 mL) was added into the remaining microsphere labeling solution. The remaining solution was centrifuged at 5000 rpm for 5 minutes. The supernatant was removed. Then ultrapure water was added to the precipitation for washing until no radioactivity can be detected in the supernatant. The radiochemical purity of the precipitated microsphere was 99.75%±1.63%.

$^{131}$I-NAH-PVA microspheres (15 mg) were prepared and suspended with 200 μL ultrapure water. About 5.5 mg of doxorubicin hydrochloride was weighed and dissolved in 200 μL ultrapure water. The doxorubicin solution was added to the microsphere suspension, and thoroughly mixed under the condition of gentle shaken. After about 15 minutes, the color of the supernatant did not change. The solution was centrifuged at 5000 rpm for 5 minutes and the supernatant was removed. The precipitate was washed three times with ultrapure water.

Under field emission scanning electron microscope, the microspheres were uniform in size and round. The average particle size of the microsphere was about 54.9±5.7 μm. The drug loading and encapsulation rate of microspheres were 25.39%±2.37% and 94.23%±0.35%, respectively. With the in vitro labeling stability study, the purity remained above 80% till 31 days.

The results of in vivo animal experiments showed that $^{131}$I-DOX-NAH-PVA microspheres (0.14 mL/kg of microsphere, 220 μCi of $^{131}$I, 1.82 mg/kg of DOX,) were injected to rats bearing orthotopic N1S1 hepatocellular carcinoma via hepatic artery. No death of the rats was observed within 60 days after the embolization (n=5). In the radioembolization group with $^{131}$I-NAH-PVA microspheres (0.14 mL/kg of microsphere, 650 μCi of $^{131}$I), no death of the tumor bearing rats was observed within 60 days after the treatment (n=5). In the chemoembolization group with DOX-NAH-PVA microspheres (0.14 mL/kg of microsphere, and 8.65 mg/kg of DOX for a high-dose chemotherapy) (n=5), no death of the tumor bearing rats was observed within 60 days after the treatment. The median survival time of the tumor bearing rats was 23 days (n=5) after treatment with $^{131}$I-NAH-PVA microspheres of the radioembolization group (0.14 mL/kg of microsphere, and 220 μCi of $^{131}$I for a low-dose radiotherapy). The median survival time of the tumor bearing rats was 22 days after treatment with DOX-NAH-PVA microspheres of chemoembolization group (0.14 mL/kg of microsphere, and 1.82 mg/kg of DOX for a low-dose chemotherapy) (n=5). The median survival time of the tumor bearing rats was 22 days after treatment with NAH-PVA microspheres of the single embolization group (0.14 mL/kg of microsphere) (n=5). These results confirmed that $^{131}$I-DOX-NAH-PVA microspheres had a good synergistic effect on the in vivo radio-chemotherapy of tumor. At a dosage of 220 μCi of $^{131}$I and 1.82 mg/kg of DOX, $^{131}$I-DOX-NAH-PVA microspheres produced an equivalent therapeutic effect to radioembolization therapy with 650 μCi of $^{131}$I or chemoembolization therapy with 8.65 mg/kg of DOX, significantly reducing the dose of radiotherapy and chemotherapy. In addition, the median survival time of the tumor bearing rats was 21 days after treating with $^{131}$I-lipiodol (0.67 mL/kg of lipiodol, 650 μCi of $^{131}$I) (n=5). The median survival time of the tumor bearing rats was 21 days (n=5) after embolization with lipiodol-DOX emulsion (0.67 mL/kg of lipiodol, 8.65 mg/kg of DOX). The median survival time of the tumor bearing rats was 46 days after embolization with DC Bead™ chemoembolization microspheres (0.18 mL/kg of microsphere, 75-150 μm of size range, 8.65 mg/kg of DOX) (n=5).

Example 3

N-acryl tryptophan (NATP) (150 mg) was weighed and dissolved in 170 μL of sodium hydroxide solution (400 mg/mL). The pH of solution was adjusted to neutral by adding concentrated hydrochloric acid. Then, 45 mg of N, N'-methylene bisacrylamide was weighed and dispersed in 200 μL ultrapure water under ultrasonification, followed by addition of 1.334 mL of 7.5% polyvinyl alcohol derivatives (molecular weight of polyvinyl alcohol: 75 kDa, N-(2,2-dimethoxyethyl)-2-acrylamide substitution degree: 12%~13%), and continued to be dissolved under ultrasonification. To the polyvinyl alcohol derivatives solution, the above NATP solution was added and mixed evenly. Then, the potassium persulfate solution (95 μL, 150 mg/mL) was added and mixed evenly. Then, the mixture was added into 8 mL of liquid paraffin wax containing 0.12 g of span 80. The solution was mixed in a water bath at 45° C. and emulsified at 600 rpm for 10 minutes under a nitrogen atmosphere. Then, 200 μL of N, N, N', N'-tetramethylethylenediamine solution (10%, v/v) was added drop by drop. The reaction liquid was placed under a nitrogen atmosphere and stirred for 12 h. After the reaction, the reaction solution was centrifuged at 5000 rpm for 5 minutes, and the liquid paraffin wax was removed. The precipitation was washed twice by ethyl acetate, absolute ethanol and ultrapure water sequentially. Then, a small amount of ultrapure water was added to disperse the precipitation. The precipitation was sifted through 70 μm- and 40 μm-sized mesh screens in order to remove the trapped part on the 70 μm-sized mesh screens and the filtered part of 40 μm-sized mesh screens, respectively. The precipitation between the 40 μm- and 70 μm-sized mesh screens was collected and centrifuged with acetone twice for dehydration. The NATP-PVA microspheres were dried overnight in a vacuum oven at room temperature.

Microspheres (15 mg) were weighed and suspended in 100 μL of pH 7.4 PBS (0.01 M). Then, 20 μL of Na$^{131}$I solution (10 mCi/mL) was added into the microsphere suspension. After mixing, 20 μL of chloramine-T PBS solution (10 mg/mL) was added and shaken and mixed. The microsphere suspension was placed in a 40° C. water bath and labeled for 40 minutes. After labeling, the labeling rate of the microspheres was 89.24%±1.27%. Ultrapure water (1 mL) was added into the remaining microsphere labeling solution. The remaining solution was centrifuged at 5000 rpm for 5 minutes. The supernatant was removed. Then, ultrapure water was added to the precipitation for washing until no radioactivity can be detected in the supernatant. The radiochemical purity of the precipitated microsphere was 99.64%±1.42%.

$^{131}$I-NAH-PVA microspheres (25 mg) were prepared and suspended with 200 μL ultrapure water. About 12 mg of doxorubicin hydrochloride was weighed and dissolved in 200 μL ultrapure water. The doxorubicin solution was added to the microsphere suspension, and thoroughly mixed under the condition of gentle shaken. After about 15 minutes, the color of the supernatant did not change. The solution was centrifuged at 5000 rpm for 5 minutes and collected. The precipitate was washed three times with ultrapure water.

Under field emission scanning electron microscope, the microspheres were uniform in size and round. The average particle size of the microsphere was about 45.29±5.9 µm. The drug loading and encapsulation rate of microspheres were 30.13%±1.73% and 92.76%±0.18%, respectively. In vitro labeling stability study showed the purity remained above 80% at 31 days.

The results of in vivo animal experiments showed that $^{131}$I-DOX-NATP-PVA microspheres (0.14 mL/kg of microsphere, 252 µCi of $^{131}$I, 1.89 mg/kg of DOX) were injected to rats bearing orthotopic N1S1 hepatocellular carcinoma via hepatic artery. No death of the rats was observed within 60 days after embolization (n=5). After treatment with $^{131}$I-NATP-PVA microsphere of the radioembolization control group (0.14 mL/kg of microsphere, 642 µCi of $^{131}$I), no death of the rats was observed within 60 days after embolization (n=5). After treatment with DOX-NATP-PVA microspheres of the chemoembolization group (0.14 mL/kg of microsphere, and 9.25 mg/kg of DOX dose for a high-dose chemotherapy) (n=5), no death of the rats was observed within 60 days. The median survival time of the tumor bearing rats was 23 days (n=5) after treatment with $^{131}$I-NATP-PVA microspheres of the radioembolization group (0.14 mL/kg of microsphere, and 252 µCi of $^{131}$I for a low-dose radiotherapy). The median survival time of the rats was 22 days after treatment with DOX-NATP-PVA microspheres of the chemoembolization group (0.14 mL/kg of microsphere, and 1.89 mg/kg of DOX for a low-dose chemotherapy) (n=5). The median survival time of the rats was 22 days after treatment with NATP-PVA microspheres of the single embolization group (0.14 mL/kg of microsphere) (n=5).

These results confirmed that $^{131}$I-DOX-NATP-PVA microspheres had a good synergistic effect on in vivo radio-chemotherapy for tumor. At a dosage of 252 µCi of $^{131}$I and 1.89 mg/kg of DOX, $^{131}$I-DOX-NATP-PVA microspheres produced an equivalent therapeutic effect to radioembolization therapy with 642 µCi of $^{131}$I or chemoembolization therapy with 9.25 mg/kg of DOX, significantly reducing the dose of radiotherapy and chemotherapy.

In addition, the median survival time of the tumor bearing rats was 21 days after treating with $^{131}$I-lipiodol (0.67 mL/kg of lipiodol, 642 µCi of $^{131}$I) (n=5). The median survival time of the rats was 21 days (n=5) after embolization with lipiodol-DOX emulsion (0.67 mL/kg of lipiodol, 9.25 mg/kg of DOX). The median survival time of the rats was 46 days after embolization with DC Bead™ chemoembolization microspheres (0.18 mL/kg of microsphere, 75-150 µm of size range, 9.25 mg/kg of DOX) (n=5).

Example 4

N-acryl tyrosine (NAT) (170 mg) was weighed and dissolve in 170 µL of sodium hydroxide solution (400 mg/mL). The pH of solution was adjusted to neutral by adding concentrated hydrochloric acid. Then, 2-acrylamido-2-methylpropanesulfonic acid (150 mg) was weighed and dissolved in 200 µL ultrapure water under ultrasonification. The N-acrylyl tyrosine solution and the 2-acrylamido-2-methylpropanesulfonic acid solution were added into 5 mL of 15% polyvinyl alcohol derivatives (molecular weight of polyvinyl alcohol: 67 kDa, N-(2,2-dimethoxyethyl)-2-acrylamide substitution degree: 12%~13%), mixed evenly. Then, potassium persulfate solution (60 µL, 150 mg/mL) was added evenly. Then, the mixture was added into 30 mL of butyl acetate containing 0.3 g of cellulose acetate butyrate. The solution was mixed in a water bath at 55° C. and emulsified at 1000 rpm for 10 minutes under a nitrogen atmosphere. Then 200 µL of N, N, N', N'-tetramethylethylenediamine solution (10%, v/v) was added drop by drop. The reaction liquid was placed under a nitrogen atmosphere and continued to stir for 4 h. After the reaction, the reaction solution was centrifuged at 5000 rpm for 5 minutes, and the supernatant was removed. The precipitation was washed twice by ethyl acetate, absolute ethanol and ultrapure water sequentially. Then, a small amount of ultrapure water was added to disperse the precipitation. The precipitation was sifted through 70 µm- and 40 µm-sized mesh screens in order to remove the trapped part on the 70 µm-sized mesh screens and the filtered part of 40 µm-sized mesh screens, respectively. The precipitation between the 40 µm- and 70 µm-sized mesh screens was collected and centrifuged with acetone twice for dehydration. The NAT-AMPS-PVA microspheres were dried overnight in a vacuum oven at room temperature.

Microspheres (5 mg) were weighed and suspended in 100 µL of pH 7.4 PBS (0.01 M). Then, 5 µL of Na$^{131}$I solution (10 mCi/mL) was added into the microsphere suspension. After mixing, 5 µL of chloramine-T PBS solution (10 mg/mL) was added and shaken and mixed. The microsphere suspension was placed in a 37° C. water bath and labeled for 30 minutes. After labeling, the labeling rate of the microspheres was 85.41%±2.54%. Ultrapure water (1 mL) was added into the remaining microsphere labeling solution. The solution was centrifuged at 5000 rpm for 5 minutes. The supernatant was removed. Then, ultrapure water was added to the precipitation for washing until no radioactivity can be detected in the supernatant. The radiochemical purity of the precipitated microsphere was 99.27%±0.62%.

$^{131}$I-NAT-AMPS-PVA microspheres (15 mg) were prepared and suspended with 200 µL ultrapure water. About 15 mg of doxorubicin hydrochloride was weighed and dissolved in 200 µL ultrapure water. The doxorubicin solution was added to the microsphere suspension, and thoroughly mixed under the condition of gentle shaken. After about 15 minutes, the color of the supernatant did not change. The solution was centrifuged at 5000 rpm for 5 minutes and the supernatant was removed. The precipitation was washed three times with ultrapure water.

Under field emission scanning electron microscope, the microspheres were uniform in size and round. The average particle size of the microsphere was about 49.3±6.5 µm. The drug loading and encapsulation rate of microspheres were 40.13%±2.72% and 80.2%±0.38%, respectively. In vitro labeling stability study showed the purity remained above 82% until 31 days.

The results of in vivo animal experiments showed that $^{131}$I-DOX-NAT-AMPS-PVA microspheres (0.14 mL/kg of microsphere, 282 µCi of $^{131}$I, 2.41 mg/kg of DOX) were injected to rats bearing orthotopic N1 S1 hepatocellular carcinoma via hepatic artery. No death of the rats was observed within 60 days after embolization (n=5). After treatment with $^{131}$I-NAH-PVA microsphere of the radioembolization control group (0.14 mL/kg of microsphere, 629 µCi of $^{131}$I), no death of the rats was observed within 60 days after embolization (n=5). After treatment with DOX-NAT-AMPS-PVA microspheres of the chemoembolization group (0.14 mL/kg of microsphere, and 9.42 mg/kg of DOX for a high-dose chemotherapy) (n=5), no death of the rats was observed within 60 days. The median survival time of the rats was 23 days (n=5) after treatment with $^{131}$I-NAT-AMPS-PVA microspheres of the radioembolization group (0.14 mL/kg of microsphere, and 282 µCi of $^{131}$I radiation for a low-dose radiotherapy). The median survival time of the rats was 23 days after treatment with DOX-NAT-AMPS-PVA microspheres of the chemoembolization group (0.14 mL/kg of microsphere, and 2.41 mg/kg of DOX for a low-dose chemotherapy) (n=5). The median survival time of the rats was 22 days after treatment with NAT-AMPS-PVA microspheres of the single embolization group (0.14 mL/kg of microsphere) (n=5). These results confirmed that $^{131}$I-DOX-NAT-AMPS-PVA microspheres had a good synergistic effect on in vivo radio-chemotherapy of tumor. At a dosage of 282 µCi of $^{131}$I and 2.41 mg/kg of DOX, $^{131}$I-DOX-NAT-AMPS-PVA produced an equivalent therapeutic effect to radioembolization therapy with 629 µCi of $^{131}$I or chemoembolization therapy with 9.42 mg/kg of DOX, significantly reducing the dose of radiotherapy and chemotherapy. In addition, the median survival time of the tumor bearing rats was 22 days after treating with $^{131}$I-lipiodol (0.67 mL/kg of lipiodol, 629 µCi of $^{131}$I) (n=5). The median survival time of the rats was 23 days (n=5) after embolization with lipiodol-DOX emulsion (0.67 mL/kg of lipiodol, 9.42 mg/kg of DOX). The median survival time of the rats was 46 days after embolization with DC Bead™ chemoembolization microspheres (0.18 mL/kg of microsphere, 75-150 µm of size range, 9.42 mg/kg of DOX) (n=5).

Example 5

N-acryl histidine (NAH) (190 mg) was weighed and dissolved in 190 µL of sodium hydroxide solution (400 mg/mL). The pH of solution was adjusted to neutral by adding concentrated hydrochloric acid. 2-acrylamido-2-methylpropanesulfonic acid (150 mg) was weighed and dissolved in 500 µL ultrapure water under ultrasonification. The N-acryl histidine solution and the 2-acrylamido-2-methylpropanesulfonic acid solution were added into 5 mL of 15% polyvinyl alcohol derivatives (molecular weight of polyvinyl alcohol: 67 kDa, N-(2,2-dimethoxyethyl)-2-acrylamide substitution degree: 12%~13%), and mixed evenly. Then, potassium persulfate solution (80 µL, 150 mg/mL) was added evenly. Then, the mixture was added into 30 mL of butyl acetate containing 0.3 g of cellulose acetate butyrate. The solution was mixed in a water bath at 55° C. and emulsified at 1000 rpm for 10 minutes under nitrogen atmosphere. Then 200 µL of N, N, N', N'-tetramethylethylenediamine solution (10%, v/v) was added drop by drop. The reaction liquid was placed under a nitrogen atmosphere and continued to stir for 5 h. After the reaction, the reaction solution was centrifuged at 5000 rpm for 5 minutes, and the supernatant was removed. The precipitation was washed twice by ethyl acetate, absolute ethanol and ultrapure water sequentially. Then, a small amount of ultrapure water was added to disperse the precipitation. The precipitation was sifted through 70 µm- and 40 µm-sized mesh screens in order to remove the trapped part on the 70 µm-sized mesh screens and the filtered part of 40 µm-sized mesh screens, respectively. The precipitation between the 40 µm- and 70 µm-sized mesh screens was collected and centrifuged with acetone twice for dehydration. The NAH-AMPS-PVA microspheres were dried overnight in a vacuum oven at room temperature.

Microspheres (10 mg) were weighed and suspended in 100 µL of pH 7.4 PBS (0.01 M). Then, 15 µL of Na$^{131}$I solution (10 mCi/mL) was added into the microsphere suspension. After mixing, 15 µL of chloramine-T PBS solution (10 mg/mL) was added and shaken and mixed. The microsphere suspension was placed in a 40° C. water bath and labeled for 40 minutes. After labeling, the labeling rate of the microspheres was 92.62%±1.71%. Add 1 mL ultrapure water into the remaining microsphere labeling solution. The solution was centrifuged at 5000 rpm for 5 minutes. The supernatant was removed. Then ultrapure water was added to the precipitation for washing until no radioactivity can be detected in the supernatant. The radiochemical purity of the precipitated microsphere was 99.41%±1.22%.

$^{131}$I-NAH-AMPS-PVA microspheres (15 mg) were prepared and suspended with 200 µL ultrapure water. About 15 mg of doxorubicin hydrochloride was weighed and dissolved in 200 µL ultrapure water. The doxorubicin solution was added to the microsphere suspension, and thoroughly mixed under the condition of gentle shaken. After about 15 minutes, the color of the supernatant did not change. The solution was centrifuged at 5000 rpm for 5 minutes and collected. The precipitate was washed three times with ultrapure water.

Under field emission scanning electron microscope, the microspheres were uniform in size and round. The average particle size of the microsphere was about 56.2±3.8 µm. The drug loading and encapsulation rate of microspheres were 50.1%±0.26% and 99.58%±0.15%, respectively. With the in vitro labeling stability study, the purity remained above 88% at 31 days.

The results of in vivo animal experiments showed that $^{131}$I-DOX-NAH-AMPS-PVA microspheres (0.14 mL/kg of microsphere, 282 µCi of $^{131}$I, 2.41 mg/kg of DOX) were injected to rats bearing orthotopic N1 S1 hepatocellular carcinoma via hepatic artery. No death of the rats was observed within 60 days after embolization (n=5). After treatment with $^{131}$I-NAH-AMPS-PVA microsphere of the radioembolization control group (0.14 mL/kg of microsphere, 648 µCi of $^{131}$I), no death of the rats was observed within 60 days after embolization (n=5). After treatment with DOX-NAH-AMPS-PVA microspheres of the chemoembolization group (0.14 mL/kg of microsphere, and 10.27 mg/kg of DOX for a high-dose chemotherapy) (n=5), no death of the rats was observed within 60 days. The median survival time of the rats was 23 days (n=5) after treatment with $^{131}$I-NAH-AMPS-PVA microspheres of the radioembolization group (0.14 mL/kg of microsphere, and 282 µCi of $^{131}$I for a low-dose radiotherapy). The median survival time of the rats was 23 days after treatment with DOX-NAH-AMPS-PVA microspheres of the chemoembolization group (0.14 mL/kg of microsphere, and 2.41 mg/kg of DOX for a low-dose chemotherapy) (n=5). The median survival time of the rats was 22 days after treatment with NAH-AMPS-PVA microspheres of the single embolization group (0.14 mL/kg of microsphere) (n=5). These results confirmed that $^{131}$I-DOX-NAH-AMPS-PVA microspheres had a good synergistic effect on the in vivo radio-chemotherapy of tumor. At a dosage of 282 µCi of $^{131}$I and 2.41 mg/kg of DOX, $^{131}$I-DOX-NAH-AMPS-PVA microspheres produced an equivalent therapeutic effect to radioembolization therapy with 648 µCi of $^{131}$I or chemoembolization therapy with 10.27 mg/kg of DOX, significantly reducing the dose of radiotherapy and chemotherapy. In addition, the median survival time of the tumor bearing rats was 21 days after treated with $^{131}$I-lipiodol (0.67 mL/kg of lipiodol, 648 µCi of $^{131}$I) (n=5). The median survival time of the rats was 23 days (n=5) after embolization with lipiodol-DOX emulsion (0.67 mL/kg of lipiodol, 10.27 mg/kg of DOX). The median survival time of the rats was 48 days after embolization with DC Bead™ chemoembolization microsphere (0.18 mL/kg of microsphere, 75-150 µm of size range, 10.27 mg/kg of DOX) (n=5).

Example 6

N-acryl tryptophan (NATP) (200 mg) was weighed and dissolved in 200 µL of sodium hydroxide solution (400 mg/mL). The pH of solution was adjusted to neutral by adding concentrated hydrochloric acid. 2-Acrylamido-2-methylpropanesulfonic acid (230 mg) was weighed and dissolved in 500 μL ultrapure water under ultrasonification. The N-acryl tryptophan solution and the 2-acrylamido-2-methylpropanesulfonic acid solution were added into 5 mL of 15% polyvinyl alcohol derivatives (molecular weight of polyvinyl alcohol: 67 kDa, N-(2, 2-dimethoxyethyl)-2-acrylamide substitution degree: 12%~13%), and mixed evenly. Then, potassium persulfate solution (60 μL, 150 mg/mL) was added evenly. Then, the mixture was added into 30 mL of butyl acetate containing 0.3 g of cellulose acetate butyrate. The solution was mixed in a water bath at 55° C. and emulsified at 1000 rpm for 10 minutes under a nitrogen atmosphere. Then 200 μL of N, N, N', N'-tetramethylethylenediamine solution (10%, v/v) was added drop by drop. The reaction liquid was placed under a nitrogen atmosphere and continued to stir for 5 h. After the reaction, the reaction solution was centrifuged at 5000 rpm for 5 minutes, and the supernatant was removed. The precipitation was washed twice by ethyl acetate, absolute ethanol and ultrapure water sequentially. Then, a small amount of ultrapure water was added to disperse the precipitation. The precipitation was sifted through 70 μm- and 40 μm-sized mesh screens in order to remove the trapped part on the 70 μm-sized mesh screens and the filtered part of 40 μm-sized mesh screens, respectively. The precipitation between the 40 μm- and 70 μm-sized mesh screens was collected and centrifuged with acetone twice for dehydration. The NATP-AMPS-PVA microspheres were dried overnight in a vacuum oven at room temperature.

Microspheres (15 mg) were weighed and suspended in 100 μL of pH 7.4 PBS (0.01 M). Then, 25 μL of Na$^{131}$I solution (10 mCi/mL) was added into the microsphere suspension. After mixing, 20 μL of chloramine-T PBS solution (10 mg/mL) was added and shaken and mixed. The microsphere suspension was placed in a 40° C. water bath and labeled for 40 minutes. After labeling, the labeling rate of the microspheres was 85.62%±3.72%. Add 1 mL ultrapure water into the remaining microsphere labeling solution. The solution was centrifuged at 5000 rpm for 5 minutes. The supernatant was removed. Then ultrapure water was added to the precipitation for washing until no radioactivity can be detected in the supernatant. The radiochemical purity of the precipitated microsphere was 99.62%±1.92%.

$^{131}$I-NATP-AMPS-PVA microspheres (25 mg) were prepared and suspended with 200 μL ultrapure water. About 30 mg of doxorubicin hydrochloride was weighed and dissolved in 200 μL ultrapure water. The doxorubicin solution was added to the microsphere suspension, and thoroughly mixed under the condition of gentle shaken. After about 15 minutes, the color of the supernatant did not change. The solution was centrifuged at 5000 rpm for 5 minutes and collected. The precipitate was washed three times with ultrapure water.

Under field emission scanning electron microscope, the microspheres were uniform in size and round. The average particle size of the microsphere was about 53.58±3.94 μm. The drug loading and encapsulation rate of microspheres were 51.4%±4.23% and 83.76%±3.62%, respectively. The in vitro labeling stability study showed the purity remained above 85% at 31 days.

The results of in vivo animal experiments showed that $^{131}$I-DOX-NATP-AMPS-PVA microspheres (0.14 mL/kg of microsphere, 282 μCi of $^{131}$I, 2.41 mg/kg of DOX) were injected to rats bearing orthotopic N1S1 hepatocellular carcinoma via hepatic artery. No death of the rats was observed within 60 days after embolization (n=5). After treatment with $^{131}$I-NATP-AMPS-PVA microsphere of the radioembolization group (0.14 mL/kg of microsphere, 629 μCi of 1310, no death of the rats was observed within 60 days after embolization (n=5). After treatment with DOX-NATP-AMPS-PVA microspheres of the chemoembolization group (0.14 mL/kg of microsphere, and 9.42 mg/kg of DOX for a high-dose chemotherapy) (n=5), no death of the rats was observed within 60 days. The median survival time of the rats was 23 days (n=5) after treatment with $^{131}$I-NATP-AMPS-PVA microspheres of the radioembolization group (0.14 mL/kg of microsphere, and 282 μCi of $^{131}$I for a low-dose radiotherapy). The median survival time of the rats was 23 days after treatment with DOX-NATP-AMPS-PVA microspheres of the chemoembolization group (0.14 mL/kg of microsphere, and 2.41 mg/kg of DOX for a low-dose chemotherapy) (n=5). The median survival time of the rats was 22 days after treatment with NATP-AMPS-PVA microspheres of the single embolization group (0.14 mL/kg of microsphere) (n=5). These results confirmed that $^{131}$I-DOX-NATP-AMPS-PVA microspheres had a good synergistic effect on the in vivo radio-chemotherapy of tumor. At a dosage of 282 μCi of $^{131}$I and 2.41 mg/kg of DOX, $^{131}$I-DOX-NATP-AMPS-PVA microspheres produced an equivalent therapeutic effect to radioembolization therapy with 629 μCi of $^{131}$I or chemoembolization therapy with 9.42 mg/kg of DOX, significantly reducing the dose of radiotherapy and chemotherapy. In addition, the median survival time of the tumor bearing rats was 22 days after treating with $^{131}$I-lipiodol (0.67 mL/kg of lipiodol, 629 μCi of $^{131}$I) (n=5). The median survival time of the rats was 22 days (n=5) after embolization with lipiodol-DOX emulsion (0.67 mL/kg of lipiodol, 9.42 mg/kg of DOX). The median survival time of the rats was 46 days after embolization with DC Bead™ chemoembolization microsphere (0.18 mL/kg of microsphere, 75-150 μm of size range, 9.42 mg/kg of DOX) (n=5).

Example 7

N-acryl tyrosine (NAT) (170 mg) was weighed and dissolved in 170 μL of sodium hydroxide solution (400 mg/mL). The pH of solution was adjusted to neutral by adding concentrated hydrochloric acid. The N-acryl tyrosine solution was added to 2 mL of 7.5% polyvinyl alcohol derivatives (molecular weight of polyvinyl alcohol: 75 kDa, N-(2,2-dimethoxyethyl)-2-acrylamide substitution degree: 12%~13%), and mixed evenly. Then, potassium persulfate solution (100 μL, 150 mg/mL) was added. The mixture was added into 10 mL of liquid paraffin wax containing 0.15 g of span 80. The solution was mixed evenly and emulsified in 55° C. water bath under a nitrogen atmosphere at 600 rpm for 10 minutes. Then 200 μL of N, N, N', N'-tetramethylethylenediamine solution (10%, v/v) was added drop by drop. The reaction liquid was placed under a nitrogen atmosphere and continued to stir for 4 h. After the reaction, the reaction solution was centrifuged at 5000 rpm for 5 minutes, and the liquid paraffin wax was removed. The precipitation was washed twice by ethyl acetate, absolute ethanol and ultrapure water sequentially. Then, a small amount of ultrapure water was added to disperse the precipitation. The precipitation was sifted through 70 μm- and 40 μm-sized mesh screens in order to remove the trapped part on the 70 μm-sized mesh screens and the filtered part of 40 μm-sized mesh screens, respectively. The precipitation between the 40 μm- and 70 μm-sized mesh screens was collected and centrifuged with acetone twice for dehydration. The NAT/PVA microspheres were dried overnight in a vacuum oven at room temperature.

Microspheres (5 mg) were weighed and suspended in 100 μL of pH 7.4 PBS (0.01 M). Then, 10 μL of Na$^{131}$I solution (10 mCi/mL) was added into the microsphere suspension. After mixing, 10 μL of chloramine-T PBS solution (10 mg/mL) was added and shaken and mixed. The microsphere suspension was placed in a 37° C. water bath and labeled for 30 minutes. After labeling, the labeling rate of the microspheres was 94.37%±1.71%. Add 1 mL ultrapure water into the remaining microsphere labeling solution. The solution was centrifuged at 5000 rpm for 5 minutes. The supernatant was removed. Then ultrapure water was added to the precipitation for washing until no radioactivity can be detected in the supernatant. The radiochemical purity of the precipitated microsphere was 99.68%±1.29%.

$^{131}$I-NAT/PVA microspheres (15 mg) were prepared and suspended with 200 μL ultrapure water. About 7.5 mg of doxorubicin hydrochloride was weighed and dissolved in 200 μL ultrapure water. The doxorubicin solution was added to the microsphere suspension, and thoroughly mixed under the condition of gentle shaken. After about 15 minutes, the color of the supernatant did not change. The solution was centrifuged at 5000 rpm for 5 minutes and collected. The precipitate was washed three times with ultrapure water.

Under field emission scanning electron microscope, the microspheres were uniform in size and round. The average particle size of the microsphere was about 55.3±6.3 μm. The drug loading and encapsulation rate of microspheres were 32.51%±2.52% and 97.51%±1.63%, respectively. Within the in vitro labeling stability study, the purity remained above 81% at 31 days.

The results of in vivo animal experiments showed that $^{131}$I-DOX-NAT/PVA microspheres (0.14 mL/kg of microsphere, 240 μCi of $^{131}$I, 1.74 mg/kg of DOX) were injected to rats bearing orthotopic N1S1 hepatocellular carcinoma via hepatic artery. No death of the rats was observed within 60 days after embolization (n=5). After treatment with $^{131}$I-NAH/PVA microsphere of the radioembolization group (0.14 mL/kg of microsphere, 540 μCi of $^{131}$I), no death of the rats was observed within 60 days after embolization (n=5). After treatment with DOX-NAT/PVA microspheres of the chemoembolization group (0.14 mL/kg of microsphere, and 8.73 mg/kg of DOX for a high-dose chemotherapy) (n=5), no death of the rats was observed within 60 days. The median survival time of the rats was 23 days (n=5) after treatment with $^{131}$I-NAT/PVA microspheres of the radioembolization group (0.14 mL/kg of microsphere, and 240 μCi of $^{131}$I for a low-dose radiotherapy). The median survival time of the rats was 22 days after treatment with DOX-NAT/PVA microspheres of the chemoembolization group (0.14 mL/kg of microsphere, and 1.74 mg/kg of DOX for a low-dose chemotherapy) (n=5). The median survival time of the rats was 22 days after treatment with NAT/PVA microspheres of the single embolization group (0.14 mL/kg of microsphere) (n=5). These results confirmed that $^{131}$I-DOX-NAT/PVA microspheres had a good synergistic effect on the in vivo radio-chemotherapy of tumor. At a dosage of 240 μCi of $^{131}$I and 1.74 mg/kg of DOX, $^{131}$I-DOX-NAT/PVA microspheres produced an equivalent therapeutic effect to radioembolization therapy with 540 μCi of $^{131}$I or chemoembolization therapy with 8.73 mg/kg of DOX, significantly reducing the dose of radiotherapy and chemotherapy. In addition, the median survival time of the tumor bearing rats was 21 days after treating with $^{131}$I-lipiodol (0.67 mL/kg of lipiodol, 540 μCi of 131I) (n=5). The median survival time of the rats was 22 days (n=5) after embolization with lipiodol-DOX emulsion (0.67 mL/kg of lipiodol, 8.73 mg/kg of DOX). The median survival time of the rats was 46 days after embolization with DC Bead™ chemoembolization microsphere (0.18 mL/kg of microsphere, 75-150 μm of size range, 8.73 mg/kg of DOX) (n=5).

Example 8

N-acryl histidine (NAH) (200 mg) was weighed and dissolved in 200 μL of sodium hydroxide solution (400 mg/mL). The pH of solution was adjusted to neutral by adding concentrated hydrochloric acid. The N-acryl histidine solution was added to 2.5 mL of 7.5% polyvinyl alcohol derivatives (molecular weight of polyvinyl alcohol: 75 kDa, N-(2,2-dimethoxyethyl)-2-acrylamide substitution degree: 12%~13%), and mixed evenly. Then, potassium persulfate solution (150 μL, 150 mg/mL) was added. The mixture was added into 10 mL of liquid paraffin wax containing 0.15 g of span 80. The solution was mixed evenly and emulsified in 40° C. water bath under a nitrogen atmosphere at 600 rpm for 10 minutes. Then 250 μL of N, N, N', N'-tetramethylethylenediamine solution (10%, v/v) was added drop by drop. The reaction liquid was placed under a nitrogen atmosphere and continued to stir for 12 h. After the reaction, the reaction solution was centrifuged at 5000 rpm for 5 minutes, and the supernatant was removed. The precipitation was washed twice by ethyl acetate, absolute ethanol and ultrapure water sequentially. Then, a small amount of ultrapure water was added to disperse the precipitation. The precipitation was sifted through 70 μm- and 40 μm-sized mesh screens in order to remove the trapped part on the 70 μm-sized mesh screens and the filtered part of 40 μm-sized mesh screens, respectively. The precipitation between the 40 μm- and 70 μm-sized mesh screens was collected and centrifuged with acetone twice for dehydration. The NAH/PVA microspheres were dried overnight in a vacuum oven at room temperature.

Microspheres (10 mg) were weighed and suspended in 100 μL of pH 7.4 PBS (0.01 M). Then, 20 μL of Na$^{131}$I solution (10 mCi/mL) was added into the microsphere suspension. After mixing, 15 μL of chloramine-T PBS solution (10 mg/mL) was added and shaken and mixed. The microsphere suspension was placed in a 40° C. water bath and labeled for 35 minutes. After labeling, the labeling rate of the microspheres was 92.13%±2.03%. Add 1 mL ultrapure water into the remaining microsphere labeling solution. The solution was centrifuged at 5000 rpm for 5 minutes. The supernatant was removed. Then ultrapure water was added to the precipitation for washing until no radioactivity can be detected in the supernatant. The radiochemical purity of the precipitated microsphere was 95.89%±2.43%.

$^{131}$I-NAH/PVA microspheres (15 mg) were prepared and suspended with 200 μL ultrapure water. About 6.5 mg of doxorubicin hydrochloride was weighed and dissolved in 200 μL ultrapure water. The doxorubicin solution was added to the microsphere suspension, and thoroughly mixed under the condition of gentle shaken. After about 15 minutes, the color of the supernatant did not change. The solution was centrifuged at 5000 rpm for 5 minutes and collected. The precipitate was washed three times with ultrapure water.

Under field emission scanning electron microscope, the microspheres were uniform in size and round. The average particle size of the microsphere was about 57.7±2.7 μm. The drug loading and encapsulation rate of microspheres were 25.39%±2.37% and 84.23%±3.41%, respectively. The in vitro labeling stability study showed the purity remained above 80% at 31 days.

The results of in vivo animal experiments showed that $^{131}$I-DOX-NAH/PVA microspheres (0.14 mL/kg of microsphere, 245 µCi of $^{131}$I, 1.96 mg/kg of DOX) were injected to rats bearing orthotopic N1S1 hepatocellular carcinoma via hepatic artery. No death of the rats was observed within 60 days after embolization (n=5). After treatment with $^{131}$I-NAH/PVA microsphere of the radioembolization group (0.14 mL/kg of microsphere, 635 µCi of $^{131}$I), no death of the rats was observed within 60 days after embolization (n=5). After treatment with DOX-NAH/PVA microspheres of the chemoembolization group (0.14 mL/kg of microsphere, and 9.25 mg/kg of DOX for a high-dose chemotherapy) (n=5), no death of the rats was observed within 60 days. The median survival time of the rats was 23 days (n=5) after treatment with $^{131}$I-NAH/PVA microspheres of the radioembolization group (0.14 mL/kg of microsphere, and 245 µCi of $^{131}$I for a low-dose radiotherapy). The median survival time of the rats was 23 days after treatment with DOX-NAH/PVA microspheres of the chemoembolization group (0.14 mL/kg of microsphere, and 1.96 mg/kg of DOX for a low-dose chemotherapy) (n=5). The median survival time of the rats was 22 days after treatment with NAH/PVA microspheres of the single embolization group (0.14 mL/kg of microsphere) (n=5). These results confirmed that $^{131}$I-DOX-NAH/PVA microspheres had a good synergistic effect on the in vivo radio-chemotherapy of tumor. At a dosage of 245 µCi of $^{131}$I and 1.96 mg/kg of DOX, $^{131}$I-DOX-NAH/PVA microspheres produced an equivalent therapeutic effect to radioembolization therapy with 635 µCi of $^{131}$I or chemoembolization therapy with 9.25 mg/kg of DOX, significantly reducing the dose of radiotherapy and chemotherapy. In addition, the median survival time of the tumor bearing rats was 21 days after treating with $^{131}$I-lipiodol (0.67 mL/kg of lipiodol, 635 µCi of $^{131}$I) (n=5). The median survival time of the rats was 22 days (n=5) after embolization with lipiodol-DOX emulsion (0.67 mL/kg of lipiodol, 9.25 mg/kg of DOX). The median survival time of the rats was 46 days after embolization with DC Bead™ chemoembolization microsphere (0.18 mL/kg of microsphere, 75-150 µm of size range, 9.25 mg/kg of DOX) (n=5).

Example 9

N-acryl tryptophan (NATP) (250 mg) was weighed and dissolved in 250 µL of sodium hydroxide solution (400 mg/mL). The pH of solution was adjusted to neutral by adding concentrated hydrochloric acid. The N-acryl histidine solution was added to 3 mL of 7.5% polyvinyl alcohol derivatives (molecular weight of polyvinyl alcohol: 75 kDa, N-(2, 2-dimethoxyethyl)-2-acrylamide substitution degree: 12%~13%), and mixed evenly. Then, potassium persulfate solution (145 µL, 150 mg/mL) was added. The mixture was added into 15 mL of liquid paraffin wax containing 0.20 g of span 80. The solution was mixed evenly and emulsified in 45° C. water bath under a nitrogen atmosphere at 600 rpm for 10 minutes. Then 300 µL of N, N, N', N'-tetramethylethylenediamine solution (10%, v/v) was added drop by drop. The reaction liquid was placed under a nitrogen atmosphere and continued to stir for 12 h. After the reaction, the reaction solution was centrifuged at 5000 rpm for 5 minutes, and the supernatant was removed. The precipitation was washed twice by ethyl acetate, absolute ethanol and ultrapure water sequentially. Then, a small amount of ultrapure water was added to disperse the precipitation. The precipitation was sifted through 70 µm- and 40 µm-sized mesh screens in order to remove the trapped part on the 70 µm-sized mesh screens and the filtered part of 40 µm-sized mesh screens, respectively. The precipitation between the 40 µm- and 70 µm-sized mesh screens was collected and centrifuged with acetone twice for dehydration. The NATP/PVA microspheres were dried overnight in a vacuum oven at room temperature.

Microspheres (20 mg) were weighed and suspended in 100 µL of pH 7.4 PBS (0.01 M). Then, 15 µL of Na$^{131}$I solution (10 mCi/mL) was added into the microsphere suspension. After mixing, 20 µL chloramine-T PBS solution (10 mg/mL) was added and shaken and mixed. The microsphere suspension was placed in a 40° C. water bath and labeled for 30 minutes. After labeling, the labeling rate of the microspheres was 86.24%±1.82%. Add 1 mL ultrapure water into the remaining microsphere labeling solution. The solution was centrifuged at 5000 rpm for 5 minutes. The supernatant was removed. Then, ultrapure water was added to the precipitation for washing until no radioactivity can be detected in the supernatant. The radiochemical purity of the precipitated microsphere was 96.58%±1.63%.

$^{131}$I-NATP/PVA microspheres (15 mg) were prepared and suspended with 200 µL ultrapure water. About 5 mg of doxorubicin hydrochloride was weighed and dissolved in 200 µL ultrapure water. The doxorubicin solution was added to the microsphere suspension, and thoroughly mixed under the condition of gentle shaken. After about 15 minutes, the color of the supernatant did not change. The solution was centrifuged at 5000 rpm for 5 minutes and collected. The precipitate was washed three times with ultrapure water.

Under field emission scanning electron microscope, the microspheres were uniform in size and round. The average particle size of the microsphere was about 49.29±2.9 µm. The drug loading and encapsulation rate of microspheres were 20.43%±1.73% and 81.72%±2.31%, respectively. Within the in vitro labeling stability study, the purity remained above 85% at 31 days.

The results of in vivo animal experiments showed that $^{131}$I-DOX-NATP/PVA microspheres (0.14 mL/kg of microsphere, 270 µCi of $^{131}$I, 1.95 mg/kg of DOX) were injected to rats bearing orthotopic N1S1 hepatocellular carcinoma via hepatic artery. No death of the rats was observed within 60 days after embolization (n=5). After treatment with $^{131}$I-NATP/PVA microsphere of the radioembolization group (0.14 mL/kg of microsphere, 650 µCi of $^{131}$I), no death of the rats was observed within 60 days after embolization (n=5). After treatment with DOX-NATP/PVA microspheres of the chemoembolization group (0.14 mL/kg of microsphere, and 8.90 mg/kg of DOX for a high-dose chemotherapy) (n=5), no death of the rats was observed within 60 days. The median survival time of the rats was 23 days (n=5) after treatment with $^{131}$I-NATP/PVA microspheres of the radioembolization group (0.14 mL/kg of microsphere, 270 µCi of $^{131}$I for a low-dose radiotherapy). The median survival time of the rats was 22 days after treatment with DOX-NATP/PVA microspheres of the chemoembolization group (0.14 mL/kg of microsphere, and 1.95 mg/kg of DOX for a low-dose chemotherapy) (n=5). The median survival time of the rats was 22 days after treatment with NATP/PVA microspheres of the single embolization group (0.14 mL/kg of microsphere) (n=5). These results confirmed that $^{131}$I-DOX-NATP/PVA microspheres had a good synergistic effect on the in vivo radio-chemotherapy of tumor. At a dosage of 270 µCi of $^{131}$I and 1.95 mg/kg of DOX, $^{131}$I-DOX-NATP/PVA microspheres produced an equivalent therapeutic effect to radioembolization therapy with 650 µCi of $^{131}$I or chemoembolization therapy with 8.90 mg/kg of DOX, significantly reducing the dose of radiotherapy and chemotherapy. In addition, the median survival time of the tumor bearing rats was 21 days after treating with $^{131}$I-lipiodol (0.67 mL/kg of lipiodol, 650 µCi of $^{131}$I) (n=5). The median survival time of the rats was 21 days (n=5) after embolization with lipiodol-DOX emulsion (0.67 mL/kg of lipiodol, 8.90 mg/kg of DOX). The median survival time of the rats was 46 days after embolization with DC Bead™ chemoembolization microsphere (0.18 mL/kg of microsphere, 75-150 µm of size range, 8.90 mg/kg of DOX) (n=5).

Example 10

N-acryl tyrosine (NAT) (120 mg) was weighed and dissolved in 120 µL of sodium hydroxide solution (400 mg/mL). The pH of solution was adjusted to neutral by adding concentrated hydrochloric acid. N, N'-methylene bisacrylamide (40 mg) was weighed and dispersed in 150 µL ultrapure water under ultrasonification, followed by addition of 1.334 mL of 7.5% polyvinyl alcohol derivatives (molecular weight of polyvinyl alcohol: 75 kDa, N-(2,2-dimethoxyethyl)-2-acrylamide substitution degree: 12%~13%), and continued to be dissolved under ultrasonification. To the polyvinyl alcohol derivatives solution, the above NAT solution was added and mixed evenly. Then, potassium persulfate solution (87 µL, 150 mg/mL) was added evenly. Then, the mixture was added into 8 mL of liquid paraffin wax containing 0.12 g of span 80. The solution was mixed in a water bath at 37° C. and emulsified at 600 rpm for 10 minutes under a nitrogen atmosphere. Then, 200 µL of N, N, N', N'-tetramethylethylenediamine solution (10%, v/v) was added drop by drop. The reaction liquid was placed under a nitrogen atmosphere and continued to stir for 12 h. After the reaction, the reaction solution was centrifuged at 5000 rpm for 5 minutes, and the liquid paraffin wax was removed. The precipitation was washed twice by ethyl acetate, absolute ethanol and ultrapure water sequentially. Then, a small amount of ultrapure water was added to disperse the precipitation. The precipitation was sifted through 70 µm- and 40 µm-sized mesh screens in order to remove the trapped part on the 70 µm-sized mesh screens and the filtered part of 40 µm-sized mesh screens, respectively. The precipitation between the 40 µm- and 70 µm-sized mesh screens was collected and centrifuged with acetone twice for dehydration. The NAT-PVA microspheres were dried overnight in a vacuum oven at room temperature.

Microspheres (5 mg) were weighed and suspended in 100 µL of pH 7.4 PBS (0.01 M). Then, 10 µL of Na$^{123}$I solution (10 mCi/mL) was added into the microsphere suspension. After mixing, 10 µL of chloramine-T PBS solution (10 mg/mL) was added and shaken and mixed. The microsphere suspension was placed in a 40° C. water bath and labeled for 35 minutes. After labeling, the labeling rate of the microspheres was 94.59%±1.31%. Add 1 mL ultrapure water into the remaining microsphere labeling solution. The solution was centrifuged at 5000 rpm for 5 minutes. The supernatant was removed. Then ultrapure water was added to the precipitation for washing until no radioactivity can be detected in the supernatant. The radiochemical purity of the precipitated microsphere was 96.62%±2.92%.

$^{123}$I-NAT-PVA microspheres (15 mg) were prepared and suspended with 200 µL ultrapure water. About 7.5 mg of doxorubicin hydrochloride was weighed and dissolved in 200 µL ultrapure water. The doxorubicin solution was added to the microsphere suspension, and thoroughly mixed under the condition of gentle shaken. After about 15 minutes, the color of the supernatant did not change. The solution was centrifuged at 5000 rpm for 5 minutes and collected. The precipitate was washed three times with ultrapure water.

Under field emission scanning electron microscope, the microspheres were uniform in size and round. The average particle size of the microsphere was about 51.2±2.5 µm. The drug loading and encapsulation rate of microspheres were 31.35%±2.42% and 98.16%±0.41%, respectively. Within the in vitro labeling stability study, the purity remained above 83% until 31 days.

The results of in vivo animal experiments showed that the distribution of $^{123}$I-DOX-NAT-PVA microspheres in the rat model could be accurately monitored with SPECT/CT imaging. $^{123}$I-DOX-NAT-PVA microspheres (0.14 mL/kg of microsphere, 8.61 mg/kg of DOX) were injected to rats bearing orthotopic N1 S1 hepatocellular carcinoma via hepatic artery. No death of the rats was observed within 60 days after embolization (n=5). The median survival time of the rats was 22 days after treatment with NAT-PVA microspheres of the single embolization group (0.14 mL/kg of microsphere) (n=5). In addition, the median survival time of the rats was 22 days (n=5) after embolization with lipiodol-DOX emulsion (0.67 mL/kg of lipiodol, 8.61 mg/kg of DOX). The median survival time of the rats was 46 days after embolization with DC Bead™ chemoembolization microsphere (0.18 mL/kg of microsphere, 75-150 µm of size range, 8.61 mg/kg of DOX) (n=5).

Example 11

N-acryl tyrosine (NAT) (170 mg) was weighed and dissolved in 170 µL of sodium hydroxide solution (400 mg/mL). The pH of solution was adjusted to neutral by adding concentrated hydrochloric acid. Then, 2-acrylamido-2-methylpropanesulfonic acid (150 mg) was weighed and dissolved in 200 µL ultrapure water under ultrasonification. The above solution was added to 5 mL of 15% polyvinyl alcohol derivatives (molecular weight of polyvinyl alcohol: 75 kDa, N-(2,2-dimethoxyethyl)-2-acrylamide substitution degree: 12%~13%), and mixed evenly. Then, potassium persulfate solution (60 µL, 150 mg/mL) was added. Then, the mixture was added into 30 mL of butyl acetate containing 0.3 g of cellulose acetate butyrate. The solution was mixed evenly and emulsified in 55° C. water bath under a nitrogen atmosphere at 1000 rpm for 10 minutes. Then, 200 µL of N, N, N', N'-tetramethylethylenediamine solution (10%, v/v) was added drop by drop. The reaction liquid was placed under a nitrogen atmosphere and continued to stir for 4 h. After the reaction, the reaction solution was centrifuged at 5000 rpm for 5 minutes, and the liquid paraffin wax was removed. The precipitation was washed twice by ethyl acetate, absolute ethanol and ultrapure water sequentially. Then, a small amount of ultrapure water was added to disperse the precipitation. The precipitation was sifted through 70 µm- and 40 µm-sized mesh screens in order to remove the trapped part on the 70 µm-sized mesh screens and the filtered part of 40 µm-sized mesh screens, respectively. The precipitation between the 40 µm- and 70 µm-sized mesh screens was collected and centrifuged with acetone twice for dehydration. The NAT-AMPS-PVA microspheres were dried overnight in a vacuum oven at room temperature.

Microspheres (5 mg) were weighed and suspended in 100 µL of pH 7.4 PBS (0.01 M). Then 5 µL of Na$^{123}$I solution (10 mCi/mL) was added into the microsphere suspension. After mixing, 5 µL of chloramine-T PBS solution (10 mg/mL) was added and shaken and mixed. The microsphere suspension was placed in a 37° C. water bath and labeled for 30 minutes. After labeling, the labeling rate of the microspheres was 85.82%±1.63%. Ultrapure water (1 mL) was added into the remaining microsphere labeling solution. The solution was centrifuged at 5000 rpm for 5 minutes. The supernatant was removed. Then ultrapure water was added to the precipitation for washing until no radioactivity can be detected in the supernatant. The radiochemical purity of the precipitated microsphere was 96.53%±2.14%.

$^{123}$I-NAT-AMPS-PVA microspheres (15 mg) were prepared and suspended with 200 μL ultrapure water. About 15 mg of doxorubicin hydrochloride was weighed and dissolved in 200 μL ultrapure water. The doxorubicin solution was added to the microsphere suspension, and thoroughly mixed under the condition of gentle shaken. After about 15 minutes, the color of the supernatant did not change. The solution was centrifuged at 5000 rpm for 5 minutes and collected. The precipitate was washed three times with ultrapure water.

Under field emission scanning electron microscope, the microspheres were uniform in size and round. The average particle size of the microsphere was about 52.7±3.5 μm. The drug loading and encapsulation rate of microspheres were 45.43%±2.61% and 90.86%±1.29%, respectively. Within the in vitro labeling stability study, the purity remained above 84% at 31 days.

The results of in vivo animal experiments showed that the distribution of $^{123}$I-DOX-NAT-AMPS-PVA microspheres in the rat model could be accurately monitored by SPECT/CT. $^{123}$I-DOX-NAT-AMPS-PVA microspheres (0.14 mL/kg of microsphere, 9.21 mg/kg of DOX) were injected to rats bearing orthotopic N1 S1 hepatocellular carcinoma via hepatic artery. No death of the rats was observed within 60 days after embolization (n=5). The median survival time of the rats was 22 days after single embolization with NAT-APMS-PVA microspheres (0.14 mL/kg of microsphere) (n=5). In addition, the median survival time of the rats was 21 days (n=5) after embolization with lipiodol-DOX emulsion (0.67 mL/kg of lipiodol, 9.21 mg/kg of DOX). The median survival time of the rats was 46 days after embolization with DC Bead™ chemoembolization microsphere (0.18 mL/kg of microsphere, 75-150 μm of size range, 9.21 mg/kg of DOX) (n=5).

Example 12

N-acryl tyrosine (NAT) (170 mg) was weighed and dissolved in 170 μL of sodium hydroxide solution (400 mg/mL). The pH of solution was adjusted to neutral by adding concentrated hydrochloric acid. The N-acryl tyrosine solution was added to 2 mL of 7.5% polyvinyl alcohol derivatives (molecular weight of polyvinyl alcohol: 75 kDa, N-(2,2-dimethoxyethyl)-2-acrylamide substitution degree: 12%~13%), and mixed evenly. Then, potassium persulfate solution (100 μL, 150 mg/mL) was added. The mixture was added into 10 mL of liquid paraffin wax containing 0.15 g of span 80. The solution was mixed evenly and emulsified in 55° C. water bath under a nitrogen atmosphere at 600 rpm for 10 minutes. Then, 200 μL of N, N, N', N'-tetramethylethylenediamine solution (10%, v/v) was added drop by drop. The reaction liquid was placed under a nitrogen atmosphere and continued to stir for 4 h. After the reaction, the reaction solution was centrifuged at 5000 rpm for 5 minutes, and the liquid paraffin wax was removed. The precipitation was washed twice by ethyl acetate, absolute ethanol and ultrapure water sequentially. Then, a small amount of ultrapure water was added to disperse the precipitation. The precipitation was sifted through 70 μm- and 40 μm-sized mesh screens in order to remove the trapped part on the 70 μm-sized mesh screens and the filtered part of 40 μm-sized mesh screens, respectively. The precipitation between the 40 μm- and 70 μm-sized mesh screens was collected and centrifuged with acetone twice for dehydration. The NAT/PVA microspheres were dried overnight in a vacuum oven at room temperature.

Microspheres (5 mg) were weighed and suspended in 100 μL of pH 7.4 PBS (0.01 M). Then 10 μL of Na$^{123}$I solution (10 mCi/mL) was added into the microsphere suspension. After mixing, 10 μL of chloramine-T PBS solution (10 mg/mL) was added and shaken and mixed. The microsphere suspension was placed in a 40° C. 5 water bath and labeled for 35 minutes. After labeling, the labeling rate of the microspheres was 95.39%±0.62%. Add 1 mL ultrapure water into the remaining microsphere labeling solution. The solution was centrifuged at 5000 rpm for 5 minutes. The supernatant was removed. Then ultrapure water was added to the precipitation for washing until no radioactivity can be detected in the supernatant. The radiochemical purity of the precipitated microsphere was 99.52%±2.53%.

$^{123}$I-NAT/PVA microspheres (15 mg) were prepared and suspended with 200 μL ultrapure water. About 7.5 mg of doxorubicin hydrochloride was weighed and dissolved in 200 μL ultrapure water. The doxorubicin solution was added to the microsphere suspension, and thoroughly mixed under the condition of gentle shaken. After about 15 minutes, the color of the supernatant did not change. The solution was centrifuged at 5000 rpm for 5 minutes and collected. The precipitate was washed three times with ultrapure water.

Under field emission scanning electron microscope, the microspheres were uniform in size and round. The average particle size of the microsphere was about 54.4±3.4 μm. The drug loading and encapsulation rate of microspheres were 33.26%±3.31% and 96.26%±2.37%, respectively. Within the in vitro labeling stability study, the purity remained above 83% at 31 days.

The results of in vivo animal experiments showed that the distribution of $^{123}$I-NAT/PVA microspheres in the rat model could be accurately monitored by SPECT/CT. $^{123}$I-DOX-NAT-PVA microspheres (0.14 mL/kg of microsphere, 8.97 mg/kg of DOX) were injected to rats bearing orthotopic N1S1 hepatocellular carcinoma via hepatic artery. No death of the rats was observed within 60 days after embolization (n=5). The median survival time of the rats was 22 days after single embolization with NAT/PVA microspheres (0.14 mL/kg of microsphere) (n=5). In addition, the median survival time of the rats was 22 days (n=5) after embolization with lipiodol-DOX emulsion (0.67 mL/kg of lipiodol, 8.97 mg/kg of DOX). The median survival time of the rats was 45 days after embolization with DC Bead™ chemoembolization microsphere (0.18 mL/kg of microsphere, 75-150 μm of size range, 8.97 mg/kg of DOX) (n=5).

Example 13

N-acryl tyrosine (NAT) (120 mg) was weighed and dissolved in 120 μL of sodium hydroxide solution (400 mg/mL). The pH of solution was adjusted to neutral by adding concentrated hydrochloric acid. N, N-methylene bisacrylamide (40 mg) was weighed and dispersed in 150 μL ultrapure water under ultrasonification, followed by addition of 1.334 mL of 7.5% polyvinyl alcohol derivatives (molecular weight of polyvinyl alcohol: 75 kDa, N-(2,2-dimethoxyethyl)-2-acrylamide substitution degree: 12%~13%), and continued to be dissolved under ultrasonification. To the polyvinyl alcohol derivatives solution, the above NAT solution was added and mixed evenly. Then, potassium persulfate solution (87 μL, 150 mg/mL) was added evenly. Then, the mixture was added into 8 mL of liquid paraffin wax containing 0.12 g of span 80. The solution was mixed in a water bath at 37° C. and emulsified at 600 rpm for 10 minutes under a nitrogen atmosphere. Then, 200 μL of N, N, N', N'-tetramethylethylenediamine solution (10%, v/v) was added drop by drop. The reaction liquid was placed under a nitrogen atmosphere and continued to stir for 12 h. After the reaction, the reaction solution was centrifuged at 5000 rpm for 5 minutes, and the liquid paraffin wax was removed. The precipitation was washed twice by ethyl acetate, absolute ethanol and ultrapure water sequentially. Then, a small amount of ultrapure water was added to disperse the precipitation. The precipitation was sifted through 70 μm- and 40 μm-sized mesh screens in order to remove the trapped part on the 70 μm-sized mesh screens and the filtered part of 40 μm-sized mesh screens, respectively. The precipitation between the 40 μm- and 70 μm-sized mesh screens was collected and centrifuged with acetone twice for dehydration. The NAT-PVA microspheres were dried overnight in a vacuum oven at room temperature.

Microspheres (5 mg) were weighed and suspended in 100 μL of pH 7.4 PBS (0.01 M). Then, 10 μL of $Na^{125}I$ solution (10 mCi/mL) was added into the microsphere suspension. After mixing, 10 μL of chloramine-T PBS solution (10 mg/mL) was added and shaken and mixed. The microsphere suspension was placed in a 37° C. water bath and labeled for 30 minutes. After labeling, the labeling rate of the microspheres was 90.41%±2.61%. Add 1 mL ultrapure water into the remaining microsphere labeling solution. The solution was centrifuged at 5000 rpm for 5 minutes. The supernatant was removed. Then, ultrapure water was added to the precipitation for washing until no radioactivity can be detected in the supernatant. The radiochemical purity of the precipitated microsphere was 98.96%±2.51%.

$^{125}I$-NAT-PVA microspheres (15 mg) were prepared and suspended with 200 μL ultrapure water. About 7.5 mg of irinotecan (IRI) was weighed and dissolved in 200 μL ultrapure water. The irinotecan solution was added to the microsphere suspension, and thoroughly mixed under the condition of gentle shaken. Then the suspension was stood and shaken every 5 minutes. About 30 minutes later, the solution was centrifuged at 5000 rpm for 5 minutes and collected. The precipitate was washed three times with ultrapure water.

Under field emission scanning electron microscope, the microspheres were uniform in size and round. The average particle size of the microsphere was about 52.7±4.6 μm. The drug loading and encapsulation rate of microspheres were 20.15%±2.11% and 61.27%±2.71%, respectively. Within the in vitro labeling stability study, the purity remained above 85% at 31 days.

The results of in vivo animal experiments showed that the distribution of 125I-IRI-NAT-PVA microspheres in the rat model could be accurately monitored by SPECT/CT. 125I-IRI-NAT-PVA microspheres (0.14 mL/kg of microsphere, 25.61 mg/kg of IRI) were injected to rats bearing orthotopic N1S1 hepatocellular carcinoma via hepatic artery. No death of the rats was observed within 60 days after embolization (n=5). The median survival time of the rats was 22 days after treatment with NAT-PVA microspheres of the single embolization group (0.14 mL/kg of microsphere) (n=5). In addition, the median survival time of the rats was 21 days (n=5) after embolization with lipiodol-IRI emulsion (0.67 mL/kg of lipiodol, 25.61 mg/kg of IRI). The median survival time of the rats was more than 60 days after embolization with DC Bead™ chemoembolization microsphere (0.18 mL/kg of microsphere, 75-150 μm of size range, 25.61 mg/kg of IRI) (n=5).

Example 14

N-acryl tyrosine (NAT) (170 mg) was weighed and dissolved in 170 μL of sodium hydroxide solution (400 mg/mL). The pH of solution was adjusted to neutral by adding concentrated hydrochloric acid. 2-Acrylamido-2-methylpropanesulfonic acid (150 mg) was weighed and dissolved in 200 μL ultrapure water under ultrasonification. The N-acryl tyrosine solution and the 2-acrylamido-2-methylpropanesulfonic acid were added into 5 mL of 15% polyvinyl alcohol derivatives (molecular weight of polyvinyl alcohol: 67 kDa, N-(2,2-dimethoxyethyl)-2-acrylamide substitution degree: 12%~13%), and mixed evenly. Then, potassium persulfate solution (60 μL, 150 mg/mL) was added evenly. Then, the mixture was added into 30 mL of butyl acetate containing 0.3 g of cellulose acetate butyrate. The solution was mixed in a water bath at 55° C. and emulsified at 1000 rpm for 10 minutes under a nitrogen atmosphere. Then 200 μL of N, N, N', N'-tetramethylethylenediamine solution (10%, v/v) was added drop by drop. The reaction liquid was placed under a nitrogen atmosphere and continued to stir for 4 h. After the reaction, the reaction solution was centrifuged at 5000 rpm for 5 minutes, and the supernatant was removed. The precipitation was washed twice by ethyl acetate, absolute ethanol and ultrapure water sequentially. Then, a small amount of ultrapure water was added to disperse the precipitation. The precipitation was sifted through 70 μm- and 40 μm-sized mesh screens in order to remove the trapped part on the 70 μm-sized mesh screens and the filtered part of 40 μm-sized mesh screens, respectively. The precipitation between the 40 μm- and 70 μm-sized mesh screens was collected and centrifuged with acetone twice for dehydration. The NAT-AMPS-PVA microspheres were dried overnight in a vacuum oven at room temperature.

Microspheres (5 mg) were weighed and suspended in 100 μL of pH 7.4 PBS (0.01 M). Then, 5 μL of $Na^{125}I$ solution (10 mCi/mL) was added into the microsphere suspension. After mixing, 5 μL of chloramine-T PBS solution (10 mg/mL) was added and shaken and mixed. The microsphere suspension was placed in a 37° C. water bath and labeled for 30 minutes. After labeling, the labeling rate of the microspheres was 89.54%±2.71%. Add 1 mL ultrapure water into the remaining microsphere labeling solution. The solution was centrifuged at 5000 rpm for 5 minutes. The supernatant was removed. Then, ultrapure water was added to the precipitation for washing until no radioactivity can be detected in the supernatant. The radiochemical purity of the precipitated microsphere was 96.59%±3.62%.

$^{125}I$-NAT-AMPS-PVA microspheres (15 mg) were prepared and suspended with 200 μL ultrapure water. About 15 mg irinotecan was weighed and dissolved in 200 μL ultrapure water. The irinotecan solution was added to the microsphere suspension, and thoroughly mixed under the condition of gentle shaken. Then the suspension was stood and shaken every 5 minutes. About 30 minutes later, the solution was centrifuged at 5000 rpm for 5 minutes and collected. The precipitate was washed three times with ultrapure water.

Under field emission scanning electron microscope, the microspheres were uniform in size and round. The average particle size of the microsphere was about 55.27±0.31 μm. The drug loading and encapsulation rate of microspheres were 32.69%±3.51% and 65.4%±2.74%, respectively.

Within the in vitro labeling stability study, the purity remained above 80% at 31 days.

The results of in vivo animal experiments showed that the distribution of $^{125}$I-IRI-NAT-AMPS-PVA microspheres in the rat model could be accurately monitored by SPECT/CT. $^{125}$I-IRI-NAT-AMPS-PVA microspheres (0.14 mL/kg of microsphere, 29.77 mg/kg of IRI) were injected to rats bearing orthotopic N1S1 hepatocellular carcinoma via hepatic artery. No death of the rats was observed within 60 days after embolization (n=5). The median survival time of the rats was 22 days after single embolization with NAT-AMPS-PVA microsphere (0.14 mL/kg of microsphere) (n=5). In addition, the median survival time of the rats was 21 days (n=5) after embolization with lipiodol-IRI emulsion (0.67 mL/kg of lipiodol, 29.77 mg/kg of IRI). The median survival time of the rats was more than 60 days after embolization with DC Bead™ chemoembolization microsphere (0.18 mL/kg of microsphere, 75-150 μm of size range, 29.77 mg/kg of IRI) (n=5).

Example 15

N-acryl tyrosine (NAT) (170 mg) was weighed and dissolved in 170 μL of sodium hydroxide solution (400 mg/mL). The pH of solution was adjusted to neutral by adding concentrated hydrochloric acid. The N-acryl tyrosine solution was added to 2 mL of 7.5% polyvinyl alcohol derivatives (molecular weight of polyvinyl alcohol: 75 kDa, N-(2,2-dimethoxyethyl)-2-acrylamide substitution degree: 12%~13%), and mixed evenly. Then, potassium persulfate solution (100 μL, 150 mg/mL) was added. The mixture was added into 10 mL of liquid paraffin wax containing 0.15 g of span 80. The solution was mixed evenly and emulsified in 55° C. water bath under a nitrogen atmosphere at 600 rpm for 10 minutes. Then, 200 μL of N, N, N', N'-tetramethylethylenediamine solution (20%, v/v) was added drop by drop. The reaction liquid was placed under nitrogen and continued to stir for 4 h. After the reaction, the reaction solution was centrifuged at 5000 rpm for 5 minutes, and the liquid paraffin wax was removed. The precipitation was washed twice by ethyl acetate, absolute ethanol and ultrapure water sequentially. Then, a small amount of ultrapure water was added to disperse the precipitation. The precipitation was sifted through 70 μm- and 40 μm-sized mesh screens in order to remove the trapped part on the 70 μm-sized mesh screens and the filtered part of 40 μm-sized mesh screens, respectively. The precipitation between the 40 μm- and 70 μm-sized mesh screens was collected and centrifuged with acetone twice for dehydration. The NAT/PVA microspheres were dried overnight in a vacuum oven at room temperature.

Microspheres (5 mg) were weighed and suspended in 100 μL of pH 7.4 PBS (0.01 M). Then 10 μL of Na$^{125}$I solution (10 mCi/mL) was added into the microsphere suspension. After mixing, 10 μL of chloramine-T PBS solution (10 mg/mL) was added and shaken and mixed. The microsphere suspension was placed in a 37° C. water bath and labeled for 45 minutes. After labeling, the labeling rate of the microspheres was 92.02%±3.98%. Add 1 mL ultrapure water into the remaining microsphere labeling solution. The solution was centrifuged at 5000 rpm for 5 minutes. The supernatant was removed. Then, ultrapure water was added to the precipitation for washing until no radioactivity can be detected in the supernatant. The radiochemical purity of the precipitated microsphere was 98.22%±3.81%.

$^{125}$I-NAT/PVA microspheres (15 mg) were prepared and suspended with 200 μL ultrapure water. About 7.5 mg of irinotecan was weighed and dissolved in 200 μL ultrapure water. The irinotecan solution was added to the microsphere suspension, and thoroughly mixed under the condition of gentle shaken. Then, the suspension was stood and shaken every 5 minutes. About 30 minutes later, the solution was centrifuged at 5000 rpm for 5 minutes and collected. The precipitate was washed three times with ultrapure water.

Under field emission scanning electron microscope, the microspheres were uniform in size and round. The average particle size of the microsphere was about 53.0±2.5 μm. The drug loading and encapsulation rate of microspheres were 19.03%±2.31% and 58.81%±4.81%, respectively. Within the in vitro labeling stability study, the purity remained above 80% at 31 days.

The results of in vivo animal experiments showed that the distribution of $^{125}$I-IRI-NAT/PVA microspheres in the rat model could be accurately monitored by SPECT/CT. $^{125}$I-IRI-NAT-PVA microspheres (0.14 mL/kg of microsphere, 35.8 mg/kg of IRI) were injected to rats bearing orthotopic N1S1 hepatocellular carcinoma via hepatic artery. No death of the rats was observed within 60 days after embolization (n=5). The median survival time of the rats was 22 days after treatment with NAT/PVA microspheres of the single embolization group (0.14 mL/kg of microsphere) (n=5). In addition, the median survival time of the rats was 22 days (n=5) after embolization with lipiodol-IRI emulsion (0.67 mL/kg of lipiodol, 35.8 mg/kg of IRI). The median survival time of the rats was more than 60 days after embolization with DC Bead™ chemoembolization microsphere (0.18 mL/kg of microsphere, 75-150 μm of size range, 35.8 mg/kg of IRI) (n=5).

The invention claimed is:

1. A microsphere prepared by polymerization and cross-linking of N-acryl amino acid monomers of general structure (1) and polyvinyl alcohol derivative macromolecular monomers of simple structure (2)

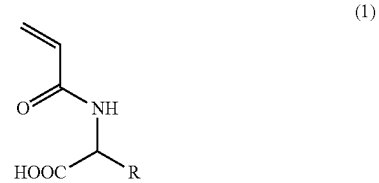

where R is one or more of the following structures:

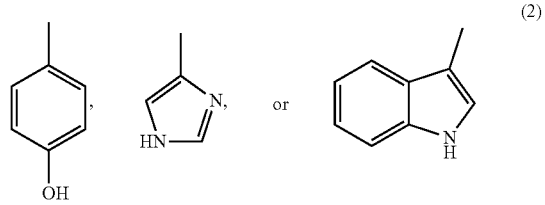

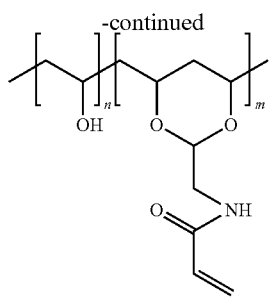

characterized in that the molecular weight range is 10 kDa~1000 kDa, formed by the aldolization of N-(2, 2-dimethoxyethyl)-2-acrylamide with the hydroxyl group of polyvinyl alcohol, wherein the substitution degree range of N-(2, 2-dimethoxyethyl)-2-acrylamide is 0.1%~40%;

and the molar ratio of the aforementioned N-acryl amino acid monomer and the polyvinyl alcohol derivative macromolecular monomer ranges from 50:1 to 1000:1 and the aforementioned microsphere preparation is able to be labeled with radionuclide iodine and simultaneously load chemotherapy agents.

2. The microsphere prepared by polymerization and crosslinking as described in claim 1, characterized by the following steps:
  (a) an aqueous solution of N-acryl amino acid monomer, polyvinyl alcohol derivative macromolecular monomer and an initiator potassium persulfate are prepared, respectively;
  (b) an oil phase solution containing an emulsifier or dispersant is prepared, where the oil phase is liquid paraffin, butyl acetate, soybean oil or silicone oil, the emulsifier is span 80 or span 60, and the dispersant is cellulose acetate butyrate;
  (c) the aqueous solution is added drop by drop to the oil phase to form an emulsion;
  (d) an aqueous solution containing catalyst N, N, N', N'-tetramethylethylenediamine is added to the emulsion to catalyze a polymerization crosslinking reaction and solidification to form microspheres and
  (e) the microspheres are washed and screened to obtain the microspheres with different size ranges.

3. The microsphere prepared by polymerization and crosslinking as described in claim 1, characterized in that said labelled radionuclide iodine is one or more of the following radioisotopes of iodine, iodine-123, iodine-125, iodine-131.

4. The microsphere prepared by polymerization and crosslinking as described in claim 1, characterized by a labeling rate of the radionuclide iodine ranging from 81% to 99.5%, and a labeling method follows the following steps:
  (a) the microspheres are suspended in a phosphate buffer;
  (b) a sodium iodide solution with the radionuclide iodine is added to (a) and mixed evenly, wherein said labelled radionuclide iodine is one or more of the following radioisotopes of iodine, iodine-123, iodine-125, iodine-131;
  (c) a phosphate buffer containing chloramine-T is added to (b) and the mixture is shaken gently to mix;
  (d) a reaction solution is placed in a 25~45° C. water bath for 10~60 minutes;
  (e) the suspension of microspheres in (d) is centrifugated and washed, and the precipitation is radionuclide iodine labeled microspheres.

5. The microsphere prepared by polymerization and crosslinking as described in claim 1, characterized in that the chemotherapeutic agent is one or more of the following drugs: doxorubicin hydrochloride, epirubicin, daunorubicin, mitoxantrone, irinotecan, topotecan.

6. The microsphere prepared by polymerization and crosslinking as described in claim 1, characterized in that the chemotherapeutic drugs doxorubicin hydrochloride, epirubicin, daunorubicin, mitoxantrone, irinotecan, topotecan are loaded into the microsphere or the prepared radionuclide iodine labeled microspheres by means of ion exchange or adsorption, with a loading capacity of 10% to 60%, wherein the loading method is as follows:
  (a) the chemotherapeutic drugs are dissolved in ultrapure water and prepared into chemotherapeutic drug solution;
  (b) the solution (a) is added to the prepared microsphere suspension or to the prepared radionuclide iodide labeled microsphere suspension, shaken for several times, and allowed to stand for 5-30 minutes and
  (c) after the centrifugation of the mixed solution (b), the supernatant is removed to obtain the drug-loaded microspheres.

7. The microsphere prepared by polymerization and crosslinking as described in claim 1, characterized by the particle size ranging from 20 to 1300 μm.

8. The microsphere prepared by polymerization and crosslinking as described in claim 1, characterized in that the microsphere further comprises 2-acrylamido-2-methylpropanesulfonic acid monomer, wherein, the molar ratios of N-acryl amino acid, 2-acrylamido-2-methylpropyl sulfonic acid and polyvinyl alcohol derivatives macromolecular monomers range from 50:50:1 to 1000:1000:1.

9. The microsphere prepared by polymerization and crosslinking as described in claim 1, characterized in that the microsphere further comprises N,N'-methylene bisacrylamide monomer, wherein the molar ratio of N-acryl amino acid, N,N'-methylene bisacrylamide and polyvinyl alcohol derivative macromolecular monomer is 50:0:1~1000:200:1.

10. The microsphere prepared by polymerization and crosslinking as described in claim 3, characterized in that the microsphere preparation contains labeled iodine-123 for embolization therapy of tumors, chemotherapy therapy and emission computed tomography or single photon emission computed tomography imaging.

11. The microsphere prepared by polymerization and crosslinking as described in claim 3, characterized in that the microsphere preparation contains labeled iodine-125 and/or iodine-131 for embolization, chemotherapy, radiotherapy and emission computed tomography or single photon emission computed tomography of tumors.

* * * * *